US012802833B2

(12) United States Patent
Mermans et al.

(10) Patent No.: US 12,802,833 B2
(45) Date of Patent: Nov. 17, 2026

(54) REMOVING A RADIOACTIVE NOBLE GAS FROM A GAS VOLUME

(71) Applicant: SCK CEN, Brussels (BE)

(72) Inventors: Jasper Mermans, Retie (BE); Dominic Maertens, Westerlo (BE); Hanna Skliarova, Breda di Piave (IT); Stephan Heinitz, Mol (BE); Thomas Cardinaels, Mol (BE)

(73) Assignee: SCK CEN, Brussels (BE)

( * ) Notice: Subject to any disclaimer, the term of this patent is extended or adjusted under 35 U.S.C. 154(b) by 591 days.

(21) Appl. No.: 18/264,023

(22) PCT Filed: Feb. 7, 2022

(86) PCT No.: PCT/EP2022/052922
§ 371 (c)(1),
(2) Date: Aug. 2, 2023

(87) PCT Pub. No.: WO2022/167669
PCT Pub. Date: Aug. 11, 2022

(65) Prior Publication Data

US 2024/0321472 A1 Sep. 26, 2024

(30) Foreign Application Priority Data

Feb. 5, 2021 (EP) .................................... 21155645

(51) Int. Cl.
*G21F 9/02* (2006.01)
*B01D 53/04* (2006.01)
*B01D 53/26* (2006.01)

(52) U.S. Cl.
CPC .......... *G21F 9/02* (2013.01); *B01D 53/0438* (2013.01); *B01D 53/0446* (2013.01);
(Continued)

(58) Field of Classification Search
CPC ......... G21F 9/02; G21F 9/00; B01D 53/0438; B01D 53/0446; B01D 53/261;
(Continued)

(56) References Cited

U.S. PATENT DOCUMENTS 9,624,151 B2 4/2017 Douglas et al.
2007/0028770 A1 2/2007 Tyndall et al.
(Continued)

FOREIGN PATENT DOCUMENTS

CN 102508285 A * 6/2012
CN 107519844 A 12/2017
(Continued)

OTHER PUBLICATIONS

Machine translation of CN 107519844 A (Year: 2017).*
(Continued)

*Primary Examiner* — Coris Fung
*Assistant Examiner* — Remy Frederic Lalisse
(74) *Attorney, Agent, or Firm* — Workman Nydegger

(57) ABSTRACT

A method for removing a radioactive noble gas from a gas volume, includes: (a) providing the gas volume such that a dew point of the gas volume at a gas temperature of 20° C. is −20° C. or less, preferably −30° C. or less, more preferably −45° C. or less; and (b) passing the gas volume over a bed of a microporous molecular sieve including a transition metal disposed on and/or in the microporous molecular sieve, thereby adsorbing the radioactive noble gas to the bed.

13 Claims, 6 Drawing Sheets

(52) U.S. Cl.
CPC ...... *B01D 53/261* (2013.01); *B01D 2253/108* (2013.01); *B01D 2253/116* (2013.01); *B01D 2257/11* (2013.01); *B01D 2257/80* (2013.01); *B01D 2259/40086* (2013.01); *B01D 2259/40088* (2013.01)

(58) Field of Classification Search
CPC ........ B01D 2253/108; B01D 2253/116; B01D 53/00; B01D 2253/00; B01D 2257/11; B01D 2257/80; B01D 2257/00; B01D 2259/40086; B01D 2259/40088; B01D 2259/00
USPC ........................................................... 588/14
See application file for complete search history.

(56) References Cited

U.S. PATENT DOCUMENTS

| | | | | |
|---|---|---|---|---|
| 2009/0202655 | A1 | 8/2009 | Kuznicki | |
| 2012/0144999 | A1 | 6/2012 | Kuznicki | |
| 2015/0245547 | A1* | 8/2015 | Robinson, Jr. ......... | B01D 53/62 156/39 |
| 2018/0065078 | A1* | 3/2018 | Hayes ................. | C01B 23/0052 |

FOREIGN PATENT DOCUMENTS

| | | | | |
|---|---|---|---|---|
| CN | 111992176 | A | 11/2020 | |
| EP | 1752206 | A1 | 2/2007 | |
| JP | S56500976 | A | 7/1981 | |
| JP | 2001270708 | A | 10/2001 | |
| JP | 2017523031 | A | 8/2017 | |
| JP | 2020163343 | A | 10/2020 | |
| RU | 2480688 | C2 | 4/2013 | |
| RU | 2641695 | C2 | 1/2018 | |
| RU | 2648896 | C1 | 3/2018 | |
| WO | 8100413 | A1 | 2/1981 | |
| WO | WO-2017087699 | A1 * | 5/2017 | ................ F24F 8/70 |

OTHER PUBLICATIONS

Machine translation of CN 102508285 A (Year: 2012).*
Mason, E. A., et al., Transport Properties of Ions in Gases. Copyright AC 1988 by John Wiley & Sons, Inc., p. 531-533 (Year: 1988).*
Chinese Office Action from Corresponding Chinese Patent Application No. CN202280008580.1, Nov. 19, 2025.
Ballard et al., "Absolute measurement of the optical polarizability of C60", The Journal of Chemical Physics, Oct. 8, 2000, vol. 113, No. 14, pp. 5732-5735.
Gaul, "The Application of Moment Analysis to the Dynamic Adsorption of Radon by Activated Carbon", The Norman J. Arnold School of Public Health, University of South Carolina, Jan. 1, 2003, 152 pages.
Graff et al., "Electric Resonance Spectrum of NaLi", The Journal of Chemical Physics, vol. 57, No. 2, Jul. 15, 1972, pp. 710-714.
Thakkar et al., "How well do static electronic dipole polarizabilities from gas-phase experiments compare with density functional and MP2 computations?", The Journal of Chemical Physics, vol. 143, Oct. 9, 2015, pp. 144302-1-144302-8.
Extended European Search Report from corresponding European Patent Application No. EP21155645.1, Jul. 1, 2021.
International Search Report from corresponding PCT Application No. PCT/EP2022/052922, May 25, 2022.
Written Opinion of the International Preliminary Examining Authority from corresponding PCT Application No. PCT/EP2022/052922, Feb. 3, 2023.
Peng, Ding-Yu et al., "A New Two-Constant Equation of State", Industrial and Engineering Chemistry Fundamentals, Feb. 1, 1976, pp. 59-64, vol. 15, No. 1.
Shumyatsky, Yuri I., "Adsorption Processes" (Textbook), D. Mendeleev University of Chemical Technology of Russia, as early as Jan. 1, 2005, 164 pages.
Russian Office Action from Corresponding Russian Patent Application No. RU2023116201/04(034685), Jun. 27, 2025.
Japanese Office Action from Corresponding Japanese Patent Application No. JP2023-544020, Sep. 30, 2025.

* cited by examiner

REMOVING A RADIOACTIVE NOBLE GAS FROM A GAS VOLUME

TECHNICAL FIELD OF THE INVENTION

The present invention relates to the removal of radioactive noble gas from a gas volume, more in particular to such removal based on adsorbing the radioactive noble gas to a bed of a microporous molecular sieve comprising a transition metal.

BACKGROUND OF THE INVENTION

There can be a need to trap or otherwise remove a radioactive noble gas from a medium (e.g. a gas volume); for example in the production of $^{225}Ac$ for medical applications. $^{225}Ac$ is a high energy alpha-emitting radioisotope with potential therapeutic uses for targeted alpha therapy (TAT). TAT is a cancer treatment method based on the high linear energy transfer (LET) of alpha particles resulting in short-range, dense ionization tracks in tissue. $^{225}Ac$ is particularly a suitable candidate for TAT thanks to its half-life (9.92 days), multiple alpha decays and favourable chemistry. Various studies have demonstrated the effectiveness of $^{225}Ac$ treatments of metastatic and late-stage cancers. At present, $^{225}Ac$ is mainly obtained from $^{229}Th$ generators coming from $^{233}U$ stockpiles. The supply of $^{225}Ac$ is therefore limited by the amount of $^{229}Th$ available worldwide. However, the current stock is not able to satisfy the demand needed for the large-scale clinical trials and worldwide cancer treatments.

Accelerator-based production of $^{225}Ac$ from $^{226}Ra$ is a possible solution to overcome this problem; one route is for example via the $^{226}Ra(\gamma,n)^{225}Ra(\beta^-)^{225}Ac$ reaction using Bremsstrahlung photons from an electron accelerator and another via the $^{226}Ra(p,2n)^{225}Ac$ reaction using proton irradiation in a cyclotron. However, such production processes represent a big technological challenge. One of the major problems of $^{225}Ac$ production based on $^{226}Ra$ precursor is the target radioactivity and the continuous emanation of radon (more specifically $^{222}Rn$). Hence, trapping of the radon is important for safe operation and to minimize its uncontrolled release through e.g. the ventilation system. Moreover, it would be industrially relevant to have a radon trapping system that can be implemented in a hot-cell environment where e.g. manipulations with gram levels of $^{226}Ra$ can be performed. However, noble gasses are nonpolar monoatomic molecules, having their outermost electron shell filled with 8 valence electrons. As such, they typically do not chemically interact with other matter. Consequently, noble gasses are notoriously difficult to trap or otherwise remove.

One known way is based on adsorption of the noble gas on an activated charcoal bed. In general, adsorption is a process in which atoms, molecules or ions—typically of a gas, liquid or (dissolved) solid—, i.e. the adsorbate, diffuses to the surface of an adsorbent—typically a solid—, where it forms a bond (chemisorption) or is held by intermolecular forces (physisorption). Adsorption is thus a surface phenomenon. Given their chemical inertness, noble gasses experience physisorption rather than chemisorption. Physisorption relies on relatively weak forces (e.g. van der Waals forces), but its efficiency can typically be improved by lowering the temperature of the adsorbent. Consequently, adsorption of noble gasses like Kr. Xe and Rn is in the prior art typically done on cryogenically cooled activated charcoal beds. An overview of reported radon adsorption results on activated carbons and under various conditions, based on literature from 1908 to 2002, was made by Gaul (GAUL, Wayne C. *The application of moment analysis to the dynamic adsorption of radon by activated carbon.* University of South Carolina, 2004. PhD thesis.).

However, this approach comes with several challenges. For example, the activated charcoal adsorption bed needs to remain cryogenically cooled (e.g. at least below 0° C., such below −50, −65 or −75° C.), otherwise the adsorption coefficient k—and thus retention time t—of the noble gas on the bed is strongly reduced. Moreover, even at cryogenic temperatures, the adsorption coefficient k is such that the activated charcoal bed must typically be large in size to trap meaningful amounts of noble gas, especially when operating the bed in continuous mode. Furthermore, cooling systems operating at cryogenic temperatures suffer from moisture condensation and freeze-out within the pipes; even when moisture traps are in place to protect the pipes, this effect might nevertheless result in blockage of the gas stream by frozen water. Finally, the large amount of charcoal itself is a significant fire hazard.

There is thus still a need in the art for better approaches to trap or otherwise remove a noble gas.

SUMMARY OF THE INVENTION

It is an object of the present invention to provide a good method for removing a noble gas from a gas volume. It is a further object of the present invention to provide good devices associated therewith. This objective is accomplished by methods, apparatuses and systems according to the present invention.

It is an advantage of embodiments of the present invention that an effective adsorption of the noble gas can be achieved.

It is an advantage of embodiments of the present invention that the amount of water adsorbed on the noble gas adsorbent bed can be reduced. It is a further advantage of embodiments of the present invention that the effective adsorption of the noble gas can be maintained for a prolonged duration.

It is an advantage of embodiments of the present invention that a particularly compact apparatus for removing a noble gas from a gas volume can be realized.

It is an advantage of embodiments of the present invention the noble gas adsorbent bed—in contrast e.g. to carbon-based materials—does not create a fire risk.

It is an advantage of embodiments of the present invention that they can be performed or installed in a nuclear environment, e.g. close to a radioactive noble gas source. It is a further advantage of embodiments of the present invention that the gas volume does not need to be transported over extended distances.

It is an advantage of embodiments of the present invention that they do not rely on cooling to be serviceable, but can e.g. be highly effective at room temperature (or even higher).

It is an advantage of embodiments of the present invention that the noble gas can be held in the apparatus (e.g. on the noble gas adsorbent bed) until it has effectively decayed.

It is an advantage of embodiments of the present invention that redundancy can be built into the apparatus, thereby increasing its efficiency and safety.

It is an advantage of embodiments of the present invention that the adsorbent beds can be straightforwardly regenerated.

It is an advantage of embodiments of the present invention that substances which can be poisonous to the adsorbent beds can be removed prior to passing the gas volume over them.

It is an advantage of embodiments of the present invention that they can be used for removing short-lived and/or long-lived radioactive noble gasses from a gas volume.

It is an advantage of embodiments of the present invention that they can be performed in a relatively straightforward and economical fashion.

In a first aspect, the present invention relates to a method for removing a radioactive noble gas from a gas volume, comprising: (a) providing the gas volume such that a dew point of the gas volume at a gas temperature of 20° C. is −20° C. or less, preferably −30° C. or less, more preferably −45° C. or less; and (b) passing the gas volume over a bed of a microporous molecular sieve comprising a transition metal disposed on and/or in the microporous molecular sieve, thereby adsorbing the radioactive noble gas to the bed.

In a second aspect, the present invention relates to an apparatus for removing a radioactive noble gas from a gas volume, comprising: (i) one or more moisture adsorbent beds, and (ii) one or more noble gas adsorbent beds of a microporous molecular sieve comprising a transition metal disposed on and/or in the microporous molecular sieve, the noble gas adsorbent beds having an input coupled to an output of the moisture adsorbent beds.

In a third aspect, the present invention relates to a multi-tiered system for removing a radioactive noble gas from a gas volume, wherein one or more of the tiers comprise an apparatus according to any embodiment of the second aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
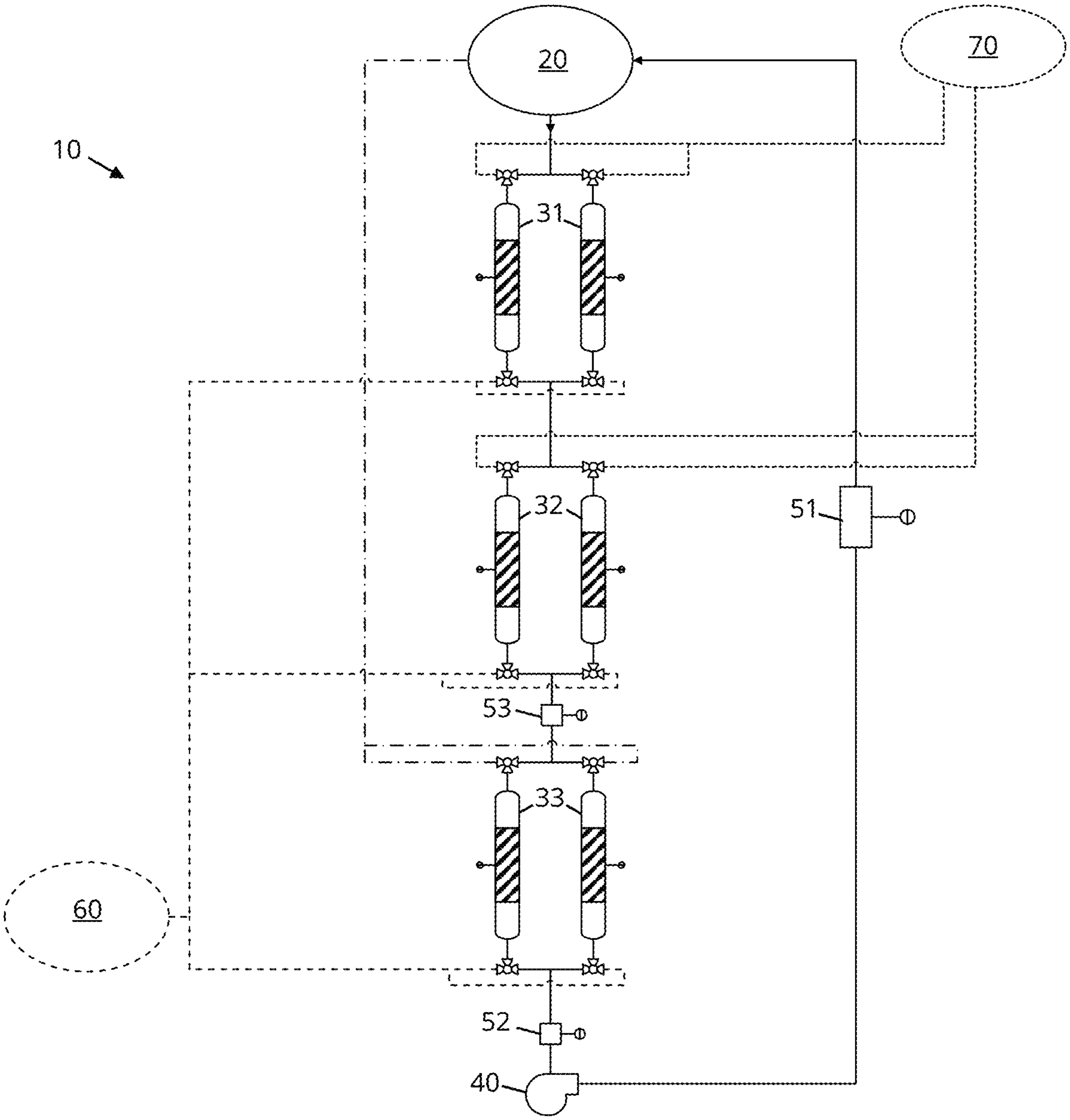
FIG. 1 schematically depicts an illustrative apparatus with built-in redundancy, for removing a radioactive noble gas in accordance with the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, zeolites are microporous alumino- and/or titanosilicate molecular sieves of natural or synthetic origin. They have complex three-dimensional structures containing cavities that can accommodate various cations and can thereby be used as adsorbents. Numerous types of zeolites exist, each with their specific characteristics; for example in terms of crystal structure, pore geometry and/or pore size.

As used herein, and unless otherwise specified, a transition-metal-exchanged microporous molecular sieve is a microporous molecular sieve which has undergone an exchange process to replace some of its atoms (typically ions) by the transition metal. For example, $Na^+$ and/or $K^+$ in the microporous molecular sieve may have been (partially) replaced by transition metal cations (e.g. $Ag^+$) in an ion-exchange reaction.

In a first aspect, the present invention relates to a method for removing a radioactive noble gas from a gas volume, comprising: (a) providing the gas volume such that a dew point of the gas volume at a gas temperature of 20° C. (293.15 K) is −20° C. or less, preferably −30° C. (243.15 K) or less, more preferably −45° C. (228.15 K) or less, such as from −60° C. (213.15 K) to −100° C. (173.15 K); and (b) passing the gas volume over (e.g. through) a bed of a transition-metal-exchanged microporous molecular sieve comprising a transition metal disposed on and/or in the microporous molecular sieve, thereby adsorbing the radioactive noble gas to the bed (which may also be referred to as 'noble gas trap').

Without being bound by theory, in an adsorption process an equilibrium is established between the amount of adsorbate in the mobile (gas or liquid) phase and on the adsorbent. This process is typically described by isotherms, expressed as the amount of adsorbed material vs. the partial pressure (in case of a gas) of the adsorbate in the fluid. Different isotherm models exist to describe this equilibrium (e.g. linear, Freundlich, Langmuir, etc.). For example, the linear isotherm, a form of Henry's law, can be used in case the amount (partial pressure) of the adsorbate is low:

$$q = K \cdot p$$

where q is the amount of adsorbate per unit mass of adsorbent, K is a temperature-dependent empirical constant and p is the partial pressure of the adsorbate in the gas stream. Moreover, when an adsorbate—in this case a noble gas (e.g. Rn)—travels through a packed column of adsorbent material with a certain affinity for the adsorbate, the adsorption process causes the adsorbate to be delayed compared to the less strongly adsorbing carrier gas (e.g. nitrogen, oxygen, etc.). Depending on the type of system, different models exist to describe the dynamics of a packed adsorption column. A simple way to describe the mean delay/retention time t (s), which is often encountered in literature on noble gas adsorption, is:

$$t = \frac{k \cdot m}{F}$$

where k ($cm^3/g$) is the adsorption coefficient, m (g) is the mass of adsorbent and F ($cm^3/s$) is the volumetric flow rate. This relationship provides a straightforward way to determine the value of the adsorption coefficient k, from a measurement of the retention time t in an experiment, in which a concentration pulse of noble gas is injected onto an adsorbent column with known mass and flow rate. The mean retention time t is defined as the time where the measured breakthrough noble gas concentration is 5% of the maximum noble gas concentration observed (cf. Example). The adsorption coefficients are important in the assessment of the capability of a (noble gas) adsorbent bed. For a given adsorbate, the coefficient may be influenced by the type of adsorbent, the temperature, the used carrier gas and its contaminants. The obtained adsorption coefficients can be compared: the higher the coefficient, the higher the affinity of the adsorbate for the adsorbent and the longer the delay.

It was now recognized within the present invention that a noble gas adsorbent bed based on a microporous molecular sieve comprising a transition metal can adsorb a significant amount of water (in the order of about 10 to 20 wt %), thereby compromising its further effectiveness in adsorbing the noble gas (cf. Example). As such, without further precautions, either the noble gas adsorbent bed needs to be regenerated often or a large bed needs to be used. However, by ensuring that its dew point is low before passing the gas volume over the noble gas adsorbent bed, the adsorption of water is significantly reduced and the bed can more efficiently adsorb noble gas for a longer period. This further enables a particularly compact design for the radioactive-noble-gas-removal apparatus—since the size of the noble gas adsorbent bed can be significantly reduced while maintaining its effectiveness—, which in turn allows the apparatus to be easily positioned close to the radioactive noble gas source (cf. infra).

In preferred embodiments, step (a) may comprise removing water from ('drying') the gas volume such that the dew point of the gas volume at a gas temperature of 20° C. is −20° C. or less, preferably −30° C. or less, more preferably −45° C. or less, such as from −60° C. to −100° C. In such embodiments, step (a) may comprise passing the gas volume over (e.g. through) a moisture adsorbent bed (which may also be referred to as a 'moisture trap'). In embodiments, the moisture adsorbent bed may comprise a further microporous molecular sieve, such as a zeolite (e.g. 4A, 13X, ZSM-5 or ETS-10). In contrast to the noble gas adsorbent bed, the moisture adsorbent bed may typically not comprise the transition metal. Preferably, drying the gas volume may be performed while the radioactive noble gas is present therein; for instance shortly—such as directly—before step (b) (as e.g. schematically depicted in FIG. 1). This advantageously allows to better ensure that the gas volume will have the desired low dew point when passing the gas volume over the noble gas adsorbent bed in step (b); e.g. even when the radioactive noble gas source is also a source of water to the gas volume. Alternatively or complementary, drying the gas volume may be performed prior to the radioactive noble gas being present therein (as e.g. described in the Example and schematically depicted in FIG. 2. This advantageously allows to dry the gas volume before it is brought into contact with the radioactive noble gas; at which point the gas volume may typically not yet be radioactive. Therefore, the drying step then does not yet involve a serious risk of radioactive exposure and any components used therefor (e.g. the moisture adsorbent bed) will not normally become radioactively contaminated. As such, the required security measures surrounding the drying step can for instance be relaxed, and the components used can more easily handled and disposed of. Note that both approaches may be combined, so that the gas volume can be easily dried prior to exposing it to the radioactive gas, while simultaneously ensuring its dew point after said exposure—e.g. directly before step (b).

In alternative or complementary embodiments, step (a) may comprise adding the radioactive noble gas to (e.g. exposing a radioactive noble gas to) a dry gas volume (e.g. a dry carrier gas). In this regard, a dry gas volume is a gas volume having a dew point at a gas temperature of 20° C. of −20° C. or less, preferably −30° C. or less, more preferably −45° C. or less, such as from −60° C. to −100° C. (cf. supra). In embodiments, the dry gas volume may be a gas volume having already undergone a drying step (cf. supra), or a gas volume that is inherently dry (e.g. a dry inert gas, such as $N_2$). The advantage of this approach is akin to what was described above for drying the gas volume prior to the radioactive noble gas being present therein. Moreover, the composition of such a dry gas volume can typically advantageously be selected such as to avoid (e.g. at least partially and preferably completely) substances therein that may be poisonous to the adsorbent bed(s) (e.g. oxidants such as $NO_x$, $CO_2$ and/or $O_2$; cf. infra); thereby reducing—or even obviating—the need for a step of removing said poisonous substances.

The gas volume may typically comprise (i) one or more of the radioactive noble gasses to be removed and (ii) a nonpolar carrier gas. For example—particularly when entering step (b)—the gas volume may substantially consist of (i) one or more of the radioactive noble gasses to be removed and (ii) the nonpolar carrier gas. In other words: any nonpolar gas remaining in the gas volume upon entering step (b) (i.e. which have not been removed before step (b); cf. infra) and which is not a radioactive noble gas which is targeted for adsorption in step (b), may be regarded as part of the nonpolar carrier gas. The nonpolar carrier gas may generally be any suitable nonpolar gas, such as (dry) $N_2$ (note that while moisture/water and substances poisonous to the adsorbent bed(s) may preferably be avoided—cf. supra—, these are typically polar and thus anyway not part of the nonpolar carrier gas). Notwithstanding, the nonpolar carrier gas may in preferred embodiments have a polarizability (a) of 1.700 Å$^3$ or below, preferably 1.600 Å$^3$ or below, more preferably 1.200 Å$^3$ or below, yet more preferably 0.800 Å$^3$ or below, most preferably 0.400 Å$^3$ or below, such as 0.300 Å$^3$ or below. Without being bound by theory, the strength of adsorption of a nonpolar gas depends in a first approximation on its polarizability, therefore the higher the polarizability the stronger the interaction with the noble gas adsorbent bed (e.g. with the transition metal therein). Accordingly, it is advantageous to use a nonpolar carrier gas with a low polarizability, so as to minimize the interaction of the nonpolar carrier gas with the noble gas adsorbent bed and leave the adsorption sites as much as possible free to adsorb the radioactive noble gas. Note in this respect that even a small difference in polarizability between two nonpolar carrier gasses may already yield a large difference in radioactive noble gas retention. Indeed, it was surprisingly observed that the use of dry air (which is approximately composed of 78% $N_2$. 21% $O_2$ and 1% Ar) resulted in an increase in the radioactive noble gas retention time up to about 30-40% compared to pure $N_2$ ($\alpha$=1.710 Å$^3$), while the use of Ar ($\alpha$=1.664 Å$^3$) already led to an in the order of tenfold increase in retention time compared to pure $N_2$. Increasingly larger effects are thus to be expected using light gasses such as $O_2$ ($\alpha$=1.562 Å$^3$), $F_2$ ($\alpha$=1.160 Å$^3$), $H_2$ ($\alpha$=0.787 Å$^3$), Ne ($\alpha$=0.381 Å$^3$), He ($\alpha$=0.208 Å$^3$), or mixtures therewith as nonpolar carrier gas. Note though that even while having a low polarizability, some of the aforementioned nonpolar gases (e.g. $O_2$, $F_2$ or $H_2$) may nevertheless chemically react with—and may thus be poisonous to—one or more of the absorbent bed materials (e.g. with the noble gas absorbent bed material), so that their overall effect may in practice nevertheless be negative in the long term. Accordingly, Ar, Ne, He and mixtures therewith may be preferred for such reasons. An extensive list of experimental polarizabilities of the different substances is provided by the National Institute of Standards and Technology at https://cccbdb.nist.gov/pollistx.asp; which are in turn derived from Olney et al. (OLNEY, Terry N., et al. Absolute scale determination for photoabsorption spectra and the calculation of molecular properties using dipole sum-rules. *Chemical physics,* 1997, 223.1: 59-98.), Landolt-Bornstein (LANDOLT-BORNSTEIN. Zahlenwerte und Funktionen. *Springer,* 1962, Vol. 1, Pt. 3, p. 509.), (GRAFF, J.; DAGDIGIAN, P. J.; WHARTON, L. Electric resonance spectrum of NaLi. *The Journal of Chemical Physics,* 1972, 57.2: 710-714.), Miller and Bederson (MILLER, Thomas M.; BEDERSON, Benjamin. Atomic and molecular polarizabilities-a review of recent advances. *Advances in atomic and molecular physics,* 1978, 13: 1-55.), Bray and Gubbins (BRAY, C. G.; GUBBINS, K. E. Theory of Molecular Fluids. Volume 1: Fundamentals. 1984.), Miller (MILLER, Kenneth J. Additivity methods in molecular polarizability. *Journal of the American Chemical Society,* 1990, 112.23: 8533-8542.), Gussoni et al. (GUSSONI, M.; RUI, M.; ZERBI, Giuseppe. Electronic and relaxation contribution to linear molecular polarizability. An analysis of the experimental values. *Journal of molecular structure,* 1998, 447.3: 163-215.), Ballard et al. (BALLARD, A.; BONIN, K.; LOUDERBACK, J. Absolute measurement of the optical polarizability of C 60. *The Journal of Chemical Physics,* 2000, 113.14: 5732-5735.), Jacobson et al. (JACOBSON, P. L., et al. Microwave spectroscopy of heliumlike Rydberg states of H 2 and D 2: Determinations of the dipole polarizabilities of H 2+ and D 2+ ground states. *Physical Review A,* 2000, 62.1: 012509.), Thakkar and Wu (THAKKAR, Ajit J.; WU, Taozhe. How well do static electronic dipole polarizabilities from gas-phase experiments compare with density functional and MP2 computations? *The Journal of Chemical Physics,* 2015, 143.14: 144302.) and Miller (MILLER, T. M. *Handbook of Chemistry and Physics Online, http://hbcponline.com/faces/documents/*10_04/10_04_0001.xhtml.). Of these, especially Olney et al. is of particular relevance to the substances under consideration. For case of comparison, any experimental determination of the polarizability of a substance may therefore preferably be done in accordance with said reference. When the nonpolar carrier gas is a mixture of substances, the weighted average (weighted for their partial pressure) of the polarizability of the individual substances may be used as the 'polarizability of the nonpolar carrier gas'.

In embodiments, removing the noble gas from the gas volume may be at least partially removing the noble gas from the gas volume. In preferred embodiments, removing the noble gas from the gas volume may be completely removing the noble gas from the gas volume.

The transition metal disposed on and/or in the microporous molecular sieve may be present in different forms. In embodiments, the microporous molecular sieve may comprise transition metal nanoparticles (i.e. the transition metal may be present in the form of nanoparticles). In alternative or complementary embodiments, the microporous molecular sieve may be a transition-metal-exchanged microporous molecular sieve (i.e. the transition metal may be present in the form of exchanged ions). In preferred embodiments, the microporous molecular sieve may be a transition-metal-exchanged microporous molecular sieve comprising transition metal nanoparticles (i.e. the transition metal may be present both in the form of exchanged atoms/ions and in the form of nanoparticles). The latter may for example typically be the case when the nanoparticles are formed from the exchanged transition metal. In embodiments, the transition metal may be metallic (e.g. typically the case for transition metal nanoparticles) and/or ionic (e.g. typically the case for exchanged transition metal) in nature. Both transition metal nanoparticles and exchanged transition metal interact with noble gasses and cause them to adsorb to the bed. The aforementioned notwithstanding,—for a given transition metal—a noble gas may typically interact more strongly (e.g. experience higher van der Waals forces) to nanoparticles of the transition metal than to the atomic transition metal. As such, where the microporous molecular sieves comprise both the transition metal nanoparticles and the exchanged transition metal, bonding to the transition metal nanoparticles may initially be dominant (and may remain so at lower partial pressures), while bonding to the exchanged transition metal may become increasingly significant as the transition metal nanoparticle sites become occupied (which may be particular relevant at higher partial pressures, such as 1 kPa or higher).

In embodiments, the transition metal nanoparticles (e.g. nanoclusters or nanodots) may have a diameter (e.g. an average diameter) between 0.2 and 100 nm, preferably between 0.5 and 50 nm, more preferably between 1 and 30 nm, yet more preferably between 2 and 20 nm, most preferably between 5 and 15 nm, such as about 10 nm. In embodiments, the transition metal nanoparticles may be disposed on a surface of the microporous molecular sieve or in pores of the microporous molecular sieve. In some embodiments, the transition metal nanoparticles may be formed (in situ) by thermally activating a transition-metal-exchanged microporous molecular sieve. For example, the transition-metal-exchanged microporous molecular sieve may be thermally activated at a temperature of from 100 to 500° C., preferably from 150 to 400° C., more preferably from 200 to 300° C., such as about 250° C. The thermal activation may be performed for a duration of from 1 to 24 hours, preferably from 3 to 18 hours, more preferably from 6 to 15 hours, yet more preferably from 9 to 12 hours. In such embodiments, not all of the exchanged transition metal will typically be transformed into transition metal nanoparticles, so that the outcome in such instances will generally be a transition-metal-exchanged microporous molecular sieve comprising transition metal nanoparticles. In alternative or complementary embodiments, the nanoparticles may be formed ex situ and deposited on and/or in the microporous molecular sieve. This can for example be done using a method like chemical vapour deposition (CVD).

In embodiments, the transition metal may be selected from group 10 (i.e. the nickel group, e.g. Ni, Pd or Pt), group 11 (i.e. the copper group; e.g. Cu, Ag or Au) and the platinum group (e.g. Ru, Rh, Pd, Os, Ir or Pt). In preferred embodiments, the transition metal may be Ag. For comparison, it is known that silver-exchanged zeolites show a higher affinity for the removal of xenon from air than sodium zeolites. Since the physical and chemical properties of noble gases are generally similar, this is expected to be true for other noble gases (e.g. Rn) as well. And indeed—at least in the case of Rn—Ag-exchanged zeolites comprising Ag nanoparticles were found to yield high noble gas adsorption coefficients (cf. Example). Likewise, based on the assumed interaction mechanism between noble gases and Ag (exchanged and/or in the form of nanoparticles), a similar effect is expected for all the group 10, group 11 and platinum group transition metal elements, with which it shares similar physical and chemical properties. That said, molecular sieves comprising these latter may potentially be less commercially relevant and/or available (e.g. due to difficulties associated with their synthesis). In some embodiments, the microporous molecular sieve may comprise more than one (form of) transition metal. For example, the microporous molecular sieve may comprise one or more types of transition metal nanoparticles, and/or one or more types of exchanged transition metal. In such instances, each of the transition metals may be independently selected from the group 10, group 11 and platinum group transition metals.

In embodiments, the microporous molecular sieve may have a pore size of 2 nm or lower, preferably between 0.2 and 1.5 nm, more preferably between 0.4 and 1.2 nm, most preferably between 0.5 and 1 nm. In embodiments, the microporous molecular sieve may be an inorganic molecular sieve, such as a zeolite. In embodiments, the microporous molecular sieve may be an aluminosilicate zeolite (e.g. ZSM-5 or 13X) or a titanosilicate zeolite (e.g. ETS-10), preferably a titanosilicate zeolite. In particularly preferred embodiments, the microporous molecular sieve may be ETS-10 or ZSM-5. (Ag-exchanged) ETS-10 and ZSM-5 comprising transition metal (Ag) nanoparticles were advantageously found to have a remarkably high trapping efficiency, especially for Rn (cf. Examples).

In embodiments, the radioactive noble gas may be selected from Ar (e.g. $^{37}$Ar, $^{39}$Ar or $^{42}$Ar), Kr (e.g. $^{85/85m}$Kr), Xe (e.g. $^{133/135}$Xe), and Rn (e.g. $^{210}$Rn, $^{211}$Rn, $^{219}$Rn, $^{220}$Rn, $^{221}$Rn or $^{222}$Rn); preferably Kr, Xe or Rn; most preferably Rn. The adsorption efficiency may typically be lower for lighter noble gasses and increasingly rise for heavier noble gases; accordingly significant adsorption of Kr. Xe and Rn can typically be achieved even at room temperature, while this is typically less so for Ar. While the mass number is not expected to significantly affect the interaction with the noble gas adsorbent bed—although the difference in half-life may affect the longevity of the noble gas (e.g. on the noble gas adsorbent bed) and therefore play a role in that respect—, the present invention is nevertheless particularly suited for removing $^{222}$Rn, for which there is a special need (cf. Background of the invention) and the present invention works remarkably well (cf. Examples).

In embodiments, the adsorbed radioactive noble gas may be held—e.g. contained within the apparatus (cf. infra)— until it has effectively decayed. For example, the adsorbed radioactive noble gas may be held until the activity of the radioactive noble gas is reduced by at least 90%, preferably at least 95%, more preferably at least 99%, yet more preferably at least 99.9%, most preferably at least 99.99%, e.g. completely (i.e. 100%). Note that holding the adsorbed noble gas may for example also include passing the noble gas from one noble gas adsorbent bed to another (or back to the moisture adsorbing bed); e.g. during regeneration of the former bed. For radioactive noble gasses with a relatively short decay, the method can thus advantageously entail trapping the noble gas and letting it decay in the apparatus (e.g. on a noble gas adsorbent bed). This is for example the case for Rn, of which the longest lived isotope is $^{222}$Rn with a half-life of 3.8 days. More specifically, for short-lived (e.g. having a half-life less than 7 days) radioactive noble gasses (isotopes), two main modes for performing the method can be distinguished: (1) passing the gas volume over the noble gas adsorbent bed at a low flow rate, such that the noble gas can effectively decay in the apparatus; or (2) passing the gas volume over the noble gas adsorbent bed at a higher flow rate, thereby decreasing the noble gas concentration in the gas volume—without fully decaying the noble gas in the apparatus, but realizing a certain decontamination factor (DF). The former may typically be preferred to trap a highly radioactive noble gas puff and/or when dealing with a continuously emitting radioactive noble gas source. The latter may be more suited when a large gas volume needs to be treated.

In other embodiments, the adsorbed radioactive noble gas may be collected for further storage and/or utilization. Indeed, for long-lived radioactive noble gasses (e.g. $^{85}$Kr, $^{39}$Ar and/or $^{42}$Ar—with a half-life of 11 years, 269 years and 32.9 years, respectively), waiting for these to decay within the apparatus (e.g. on the noble gas adsorbent bed) may typically be unrealistic in practice. As such, the method may rather entail trapping the noble gas on the noble gas adsorbent bed—thereby concentrating it—and subsequently removing the noble gas from the noble gas adsorbent bed (e.g. during regeneration thereof). The noble gas can then be collected, and stored and/or used in another application.

In embodiments, the method may comprise a further step ($\alpha'$), before step (b) (and preferably before step ($\alpha$)), of: ($\alpha'$) removing from the gas volume a substance (e.g. an oxidant, such as $NO_x$, $CO_2$ and/or $O_2$) that may be poisonous to the noble gas adsorbent bed (e.g. the microporous molecular sieve as such and/or to the transition metal) and/or—if present—to the moisture adsorbent bed. In this context, a substance that is ‘poisonous’ to an adsorbent bed is a substance—other than an adsorbate for which use of the adsorbent bed was specifically intended—which binds or reacts reversibly or irreversibly with the adsorbent bed and thereby lowers its trapping efficiency for the intended adsorbate. In embodiments, step ($\alpha'$) may comprise passing the gas volume over (e.g. through) a scrubber. For example, an NaOH scrubber may be used to remove $NO_x$. If such poisonous substances can be expected in the gas volume, removing them prior to passing the gas volume over the noble gas adsorbent bed (and/or prior to passing it over the moisture adsorbent bed) advantageously allows to better maintain its efficiency; akin to how ensuring a low dew point improves the effectiveness of the gas adsorbent bed.

In embodiments, the method may comprise a further step (c) of: (c) regenerating the noble gas adsorbent bed and/or—if present—the moisture adsorbent bed. In embodiments, step (c) may comprise: heating the noble gas adsorbent bed and/or—if present—the moisture adsorbent bed; and/or flushing the noble gas adsorbent bed and/or—if present—the moisture adsorbent bed with a regeneration gas (e.g. an inert gas, such as $N_2$ or Ar; or another gas, such as air). In this respect, it was advantageously found that the radioactive noble gas can be quickly and efficiently (in a sharp pulse; cf. Example 2) stripped from the noble gas absorbent bed using a regeneration gas comprising water (moisture). Without being bound by theory, it is believed that the water molecules strongly compete with the noble gas (e.g. Rn) for the active adsorption sites on the Ag nanoparticles and thereby effectively strip the noble gas from the bed. As such, the regeneration gas may in preferred embodiments comprise a competing absorbate (i.e. an adsorbate which competes with the noble gas, such as water). In embodiments, heating the noble gas adsorbent bed may comprise externally heating the noble gas adsorbent bed (e.g. by wrapping it with a heating element, or placing it in a furnace or oven) and/or internally heating the noble gas adsorbent bed (e.g. by using hot regeneration gas). In embodiments, heating the noble gas adsorbent bed may comprise heating the noble gas adsorbent bed to a temperature of from 100 to 500° C. preferably from 150 to 400° C., yet more preferably from 200 to 350° C.

In preferred embodiments, the method (e.g. at least step (b) therein) may be performed at a temperature of from −150° C. to 50° C., preferably from −100 to 40° C., more preferably from −50 to 35° C. yet more preferably from 0 to 30° C., most preferably at room temperature (e.g. from 15 to 25° C., such as 20° C.). Although the present invention advantageously allows to reach a good adsorption efficiency without the need cooling, operating at lower temperatures may still further improve the adsorption efficiency.

In embodiments, the method may be performed in a nuclear environment. For example, the gas volume may originate from a radioactive noble gas source and the method may be performed in close proximity to (e.g. within 15 m, preferably within 10 m, more preferably within 5 m, yet more preferably within 3 m, still yet more preferably within 2 m, most preferably within 1 m, from) said noble gas source. In embodiments, the radioactive noble gas source may be located in a nuclear glove box, hot cell, target station, bunker or irradiation rig. In embodiments, the method may be performed in close proximity to or in said nuclear glove box, hot cell, target station, bunker or irradiation rig. By performing the method close to the radioactive noble gas source, it is advantageously avoided that radioactive gas needs to be transported over extended distance, so that the risks associated therewith can be prevented.

In embodiments, any feature of any embodiment of the first aspect may independently be as correspondingly described for any embodiment of any of the other aspects.

In a second aspect, the present invention relates to an apparatus for removing a radioactive noble gas from a gas volume, comprising: (i) one or more moisture adsorbent beds, and (ii) one or more noble gas adsorbent beds of a microporous molecular sieve comprising a transition metal disposed on and/or in the microporous molecular sieve, the noble gas adsorbent beds having an input coupled to an output of the moisture adsorbent beds.

In embodiments, the apparatus may further comprise: (iii) one or more regeneration gas supplies coupled to the noble gas adsorbent beds and optionally to the moisture adsorbent beds. In embodiments, the one or more regeneration gas supplies may be coupled to the output of the noble gas adsorbent bed(s). In doing so, the noble gas adsorbent bed can be easily regenerated (in a direction opposite the normal gas volume flow) while keeping any radioactive gas remaining on a noble gas adsorbent bed in the apparatus (e.g. over a parallel second noble gas adsorbent bed or back into a moisture adsorbent bed).

In embodiments, the apparatus may further comprise: (iv) one or more scrubbers for removing from the gas volume a substance that is poisonous to the noble gas adsorbent bed and/or to the moisture adsorbent bed. In embodiments, the scrubber(s) may have an output coupled to an input of the noble gas adsorbent bed(s)—e.g. through the moisture adsorbent bed(s).

By using multiple noble gas adsorbent beds, moisture adsorbent beds, scrubbers, etc., a certain amount of redundancy can advantageously be built into the apparatus. For example, while one noble gas or moisture adsorbent bed is being regenerated, another may be in active use; or—complementary or alternatively—(yet) another may be in standby (e.g. as a backup). Such redundancy allows to improve the level of efficiency (e.g. by allowing more continuous use) and safety (e.g. by having one or more backups in case one of the elements becomes defective). An example of such an apparatus (10) is depicted in FIG. 1, showing an environment contaminated with a radioactive noble gas (20; e.g. $^{222}Rn$) that is coupled in turn to two parallel columns of scrubbers (31), two parallel columns of moisture adsorbent beds (32) and two parallel columns of noble gas adsorbent beds (33). A ventilator (40) draws the gas volume comprising the radioactive noble gas through the columns (31-33) and circulates it—after (partial) removal of the noble gas—back to the original environment (20). The content of the radioactive noble gas in the back-circulated gas volume is checked using a noble gas monitor (51). The flow rate of the gas volume through the apparatus (10) is controlled by a flow controller (52) situated between the noble gas adsorbent beds (33) and the ventilator (40). A dew point (or relative humidity) meter (53) is positioned between the moisture adsorbent beds (32) and the noble gas adsorbent beds (33). If either the measured noble gas content or dew point is too high (e.g. exceeding a predetermined threshold), either the flow rate can be reduced—thereby allowing more time for trapping the noble gas and/or water on their respective columns (32, 33)—or the columns can be regenerated. To this end, each of the columns (31-33) is coupled to a regeneration gas supply (60). Note that while one column is being regenerated, the parallel redundant column can be used and the apparatus (10) can function continuously. As depicted in FIG. 1, coupling with the regeneration gas supply is realized through the output of the columns, so that adsorbates desorbed by the regeneration process are pushed upstream. In the case of the scrubbers (31) and moisture adsorbent beds (32), the desorbed poisonous compounds and water are typically evacuated to an exhaust (70). However, the amount of radioactive noble gas evacuated through the exhaust must typically be kept to a minimum (e.g. below a predefined threshold). In other words, if the concentration of radioactive noble gas has not been sufficiently reduced, it should not be evacuated. For a noble gas that decays in the apparatus (10), the through regeneration desorbed noble gas could thereto either (1) be led over the parallel column to be trapped there, (2) be pushed upstream back into the moisture adsorbent columns (although this could compromise the apparatus' continuous operation) or (3) be circulated back into the original environment (20) to be passed again through the full apparatus. In case of a noble gas that doesn't decay on the column, the last route coupled to a storage unit—rather than the original environment as depicted in FIG. 1—can be used to collect the radioactive noble gas after it was concentrated on the noble adsorbent bed.

In embodiments, the gas adsorbent beds, moisture adsorbent beds and/or scrubbers may be in form columns through which the gas volume is passed.

In embodiments, any feature of any embodiment of the second aspect may independently be as correspondingly described for any embodiment of any of the other aspects.

In a third aspect, the present invention relates to a multi-tiered system for removing a radioactive noble gas from a gas volume, wherein one or more of the tiers comprise an apparatus according to any embodiment of the second aspect.

For example, an apparatus in accordance with the present invention may be attached to a first container (e.g. a receptacle, glove box or hot cell) for removing a radioactive noble gas from a gas volume in said first container, while a further apparatus (also in accordance with the present invention or based on a different principle) may be attached to a further container—encompassing the first—(e.g. a glove box or hot cell in which the receptacle is located, or a room or bunker in which the receptacle, glove box or hot cell is located) for removing a radioactive noble gas (e.g. the same noble gas) from a gas volume in the further container. In doing so, a highly effective multi-tier system can be realized in which the first apparatus can remove the bulk of the radioactive noble gas, while any that slips through (e.g. into an exhaust of said first apparatus) can be caught by the further apparatus overarching the first. In embodiments, the first apparatus may be operated using a low flow rate, whereas the further apparatus may be operated using a high flow rate (cf. supra).

In embodiments, any feature of any embodiment of the third aspect may independently be as correspondingly described for any embodiment of any of the other aspects.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1

A number of different experiments have been performed using Rn as the noble gas and different types of noble gas adsorbent bed, in order to illustrate and support a proof-of-concept for the present invention. Notwithstanding, it will be clear that these experiments can likewise be performed using different noble gases and/or further noble gas adsorbent beds.

Note that although these experiments reliably indicate the general trends involved, more systematic and rigorous studies could be performed to arrive at a more complete picture. Any specific values that follow from the present experiments are therefore rather to be regarded as preliminary results. Furthermore, it is believed that there is still room to further optimize the achieved results; for example, an even higher adsorption coefficient k may be achieved by further fine-tuning the process and/or the morphology of the adsorbent.

1. Adsorbent Materials

Four adsorbents were tested and compared: an activated carbon and three types of silver-exchanged zeolites comprising Ag nanoparticles. The latter were made by thermally activating the silver-exchanged zeolites so as to form the Ag nanoparticles therein and/or thereon.

Activated Carbon

Activated carbon is a highly porous material—essentially composed out of carbon—with high surface area, which makes it suitable for adsorption applications. It is typically produced from carbonaceous materials, such as wood or coconut shells. Activated carbon can be regarded as the current benchmark material for capturing noble gases. In the present experiment, NuclearCarb 207C activated carbon with mesh size 6×12 was chosen because—based on literature study—it showed promising potential for radon capture at room temperature. It represents a high activity granular carbon manufactured from coconut shells and supplied by Chemviron Carbon (United Kingdom).

Silver-Exchanged Zeolites

Three different types of silver-exchanged zeolites were evaluated in the present experiment.

Ag-13X: 13X is an aluminosilicate molecular sieve in which (some of) the sodium cations have been exchanged with silver ions (chemical formula: $Ag_{84}Na_2[(AlO_2)_{86}(SiO_2)_{106}]$). For the present experiment, a granular silver-exchanged Ag-13X with mesh size 10-20 and chemical formula $Ag_{84}Na_2[(AlO_2)_{86}(SiO_2)_{106}]\cdot xH_2O$ was supplied by Sigma-Aldrich (Belgium).

Ag-ZSM-5: ZSM-5 is an aluminosilicate zeolite specifically developed by the "Commissariat à l'énergie atomique et aux énergies alternatives" (CEA) for the new generation SPALAX™ system, with the aim to replace the existing activated carbon columns for the purification/concentration stage of the process and reduce the size and energy consumption of this stage. Ag-ZSM-5 was provided by CEA, France, in the form of 20-50 mesh spherical particles.

Figure 11:
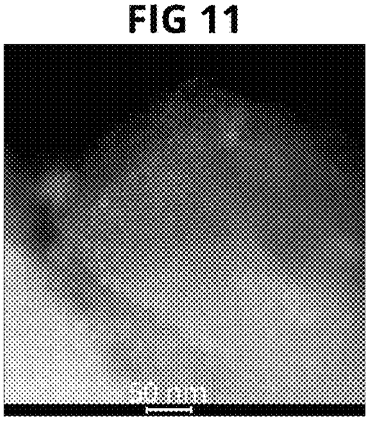
FIG. 11 is a scanning electron microscopy image of silver nanospheres on Ag-ETS-10 crystals in accordance with the second example.

Ag-ETS-10: ETS-10 is a microporous titanosilicate molecular sieve with a Si/Ti ratio of approximately 5 and two exchangeable cations for each Ti. It has a pore size of approximately 1 nm. Ag-ETS-10 has the unusual ability to auto-reduce-upon heating-exchanged silver to nanospheres of dimensions of <10 nm (cf. FIG. 11). Two forms of Ag-ETS-10 were used in the present invention: bound 1.5 mm pellets and binder-less 16-30 mesh granules were supplied by Extraordinary Adsorbents Inc. (Edmonton, Alberta, Canada).

2. Experimental Setup

Figure 2:
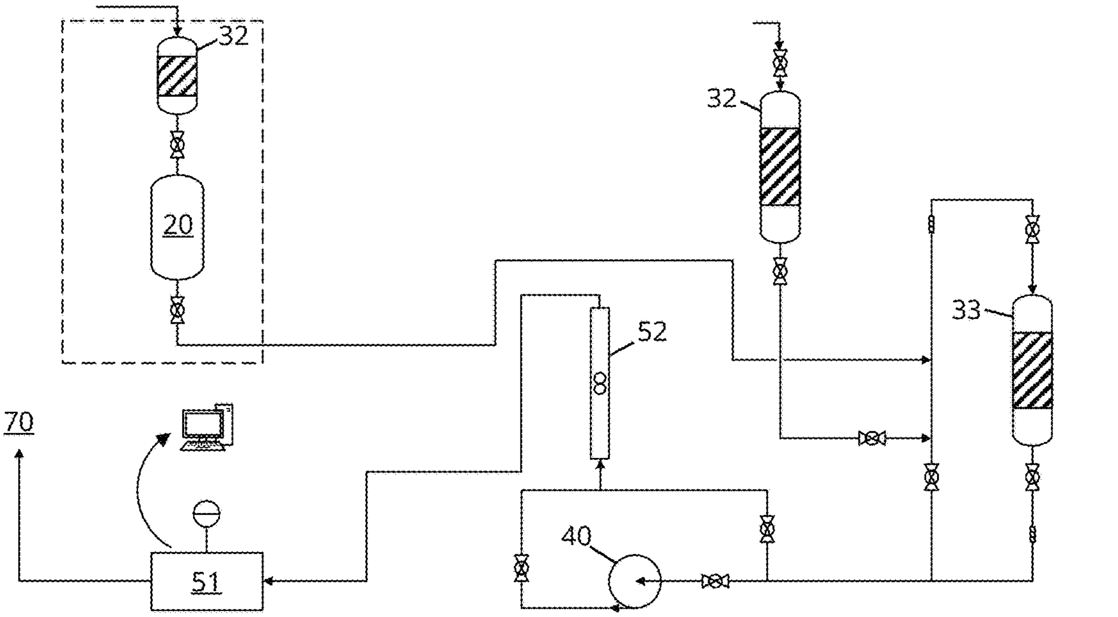
FIG. 2 schematically depicts an experimental setup used for proof-of-concept radon adsorption experiments in accordance with a first example described herein.

Room temperature radon adsorption experiments were performed using an experimental setup as schematically depicted in FIG. 2. The apparatus comprised a radon trap column (33) with a volume of 120 ml, filled with one of the aforementioned adsorbents. The column (33) was equipped with quick-connects, ensuring an easy and quick removal and/or replacement.

Air was fed to the trapping device (33) via an $^{222}Rn$ source (20; cf. infra), or via an extra branch that allowed to supply 'low-radon' (e.g. natural abundance level) laboratory air. The branch was equipped with a moisture trap (32; Agilent MT1204) containing a mixture of 13X- and 4A-type desiccant. Likewise, the radon-containing air was dehumidified by a corresponding moisture trap (32) in front of the $^{222}Rn$ source (20). The humidity of the air was monitored using a dew point meter (not depicted in FIG. 2; Michell Easidew Online EA2-TX-100).

Radon for this study was generated by a Pylon Model RN-1025 flow through gas source (20) containing $^{226}Ra$ with an activity of 3.8 MBq. It consisted of a dry powder, enclosed between glass and plastic filters to avoid release of non-gaseous substances. The total volume of the source was $^{244}$ mL. The maximum flow rate through the source (20) was around 10 l/min.

The radon adsorbent column was connected to a vacuum pump (40; KNF LABOPORT N86) providing a nominal flow rate of 6 l/min. An extra loop allowed to bypass the pump (40). The flow rate was measured and regulated with a flowmeter (52; Vogtlin Q-Flow FLQ-CESA-BD) operating in a range from 0.2 to 2.2 l/min.

The flowmeter (52) was connected to a professional radon monitor (51; AlphaGUARD DF2000) to measure the radon activity/concentration leaving the adsorption column (33). The monitor (51) was equipped with a flow-regulated pump that was adjusted from 0.5 to 1 l/min in the present experiments.

Typical experimental parameters were as listed in the table below.

| Parameter | Range |
|---|---|
| Flow rate (l/min) | 0.5-1 |
| Column diameter (cm) | 1-3 |
| Injected amount of $^{222}$Rn (kBq) | 100-500 |
| Mass of adsorbent (g) | 5-100 |
| Dew point (° C.) | −60-−85 |
| Temperature (° C.) | 20-25 |

3. Experimental Procedure

Sample Pre-Treatment

The activated carbon and the silver-exchanged zeolites were thermally activated in a resistance furnace—either a Nabertherm L3/P (1993) or Carbolite AAF 11/7—prior to each experiment. The furnace set to approximately 250° C. was used to activate Ag-13X, Ag-ETS-10 and Ag-ZSM-5 overnight (for at least 12 h) before the experiment. The carbon samples were activated at a temperature of 150° C. After activation, each sample was immediately transferred into the experimental column under laboratory conditions.

Moisture uptake of each material was also evaluated by recurrently measuring the mass of a regenerated sample exposed to laboratory air on a balance over a period of several days.

Breakthrough Experiments

Figure 3:
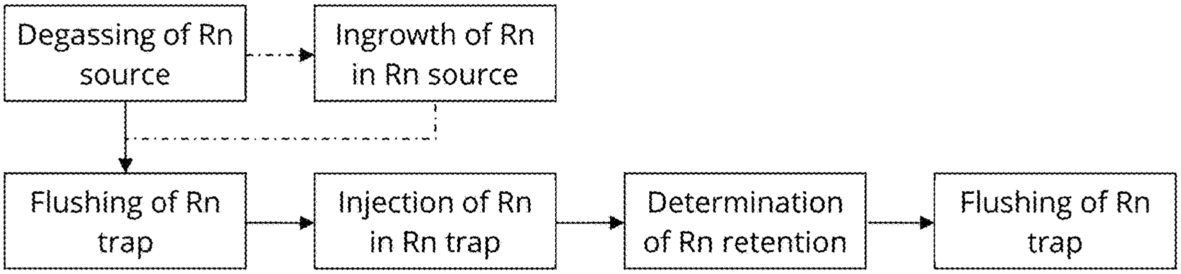
FIG. 3 is a flow chart of the process steps used during breakthrough experiments in accordance with the first and second example.

Breakthrough experiments were performed in accordance with the flow chart given in FIG. 3.

In a first step, the Pylon RN-1025 is degassed to remove $^{222}$Rn that has accumulated in the source since its last use. The degassing step is necessary in order to reduce the total 222Rn activity injected in the test setup. A column with approx. 50 g NuclearCarb 207C was installed to perform the degassing and capture of accumulated radon. The degassing was performed for 1 hours at 1 l/min. The column was removed after complete degassing of the RN-1025 chamber. A new column containing the investigated adsorbent was then installed into the setup.

After approximately 3.5 hours, the radon source was flushed again in order to accumulate roughly 100 kBq of radon on the adsorbent to be tested. After trapping the radon on the column, the radon source was closed and clean air was fed to the column using the pump of the radon monitor. The experiment was terminated when all injected radon has passed through the column. At the end of each experiment, the system was flushed with clean air.

4. Results & Discussion

Impact of Using Adsorbents

Figure 4:
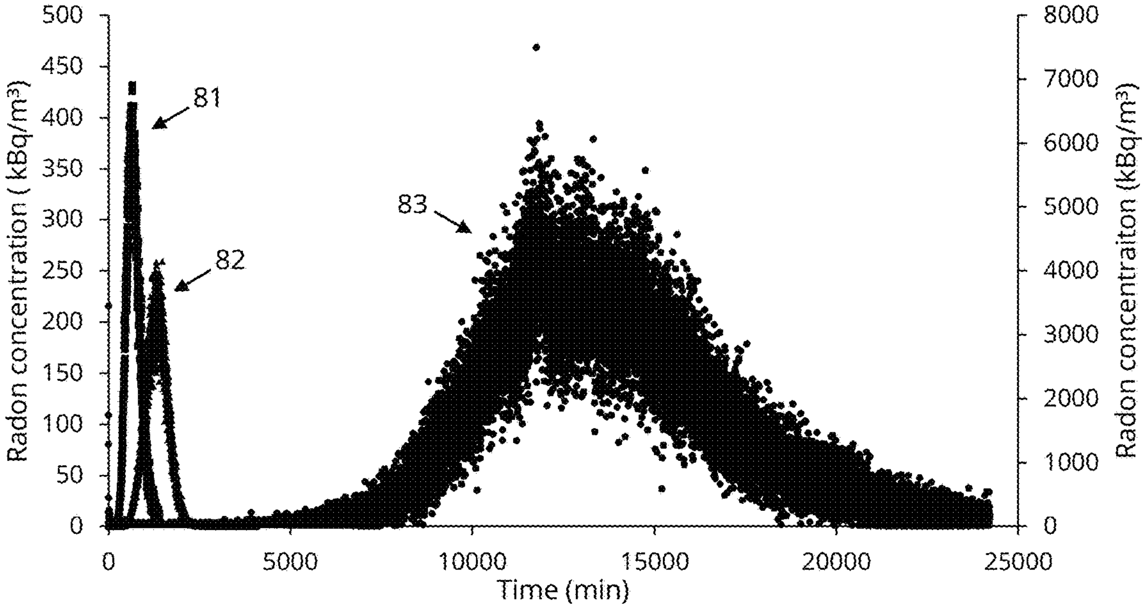
FIG. 4 is a graph of $^{222}$Rn breakthrough curves for NuclearCarb 207C, Ag-13X and 1.5 mm Ag-ETS-10 pellets in accordance with the first example.
Figure 5:
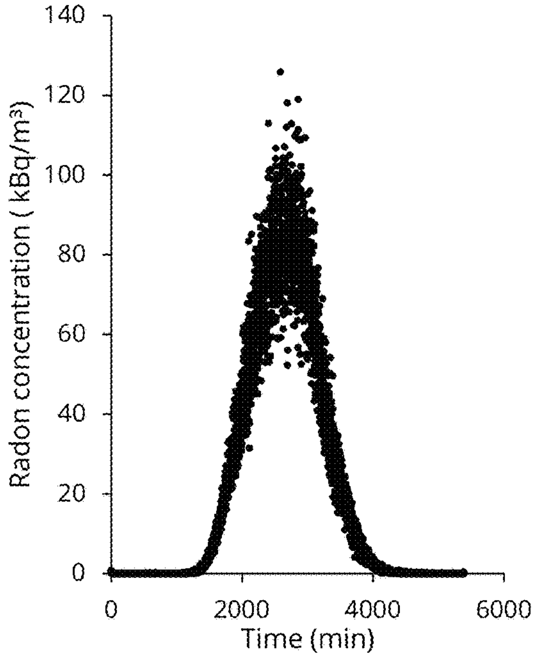
FIG. 5 is a graph of an $^{222}$Rn breakthrough curve for Ag-ZSM-5 in accordance with the first example.
Figure 6:
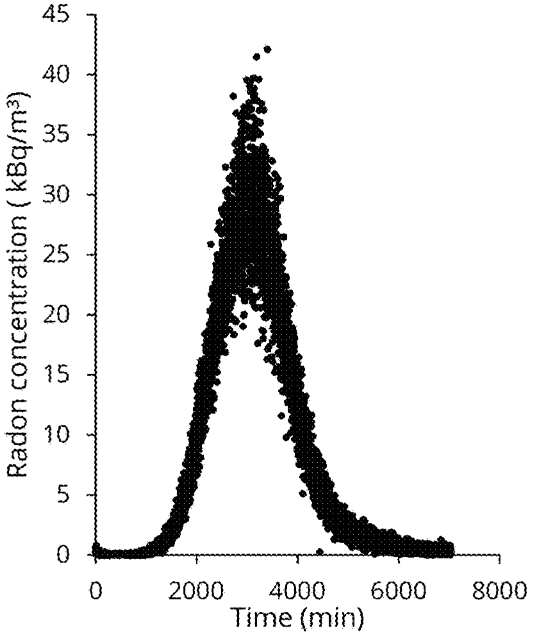
FIG. 6 is a graph of an $^{222}$Rn breakthrough curve for 16-30 mesh Ag-ETS-10 granules in accordance with the first example.

The radon breakthrough curve for three different adsorbents—NuclearCarb 207C (81), Ag-13X (82) and Ag-ETS-10 (bound 1.5 mm pellets; 83)—is shown in FIG. 4. The breakthrough curve for Ag-ZMS-5 and Ag-ETS-10 (binderless 16-30 mesh) are shown in FIG. 5 and FIG. 6, respectively. The preliminary results are summarized in the table below. The obtained adsorption coefficients k, in ascending order, were 2680 ml/g (Ag-13X), 2750 ml/g (NuclearCarb 207C), 50960 ml/g (Ag-ZSM-5), 115000 ml/g (Ag-ETS-10, 1.5 mm pellets), 320000 ml/g (Ag-ETS-10, 16-30 mesh granules). Ag-ETS-10 sorbents exhibited the highest adsorption coefficient and outperformed the other sorbents. The small 16-30 mesh Ag-ETS-10 granulates had a mean retention time t of 25 hours at 1 l/min and dew point of −75° C. for only 4.69 gr of material, resulting in the highest adsorption coefficient of the tested materials. At least 100 g of NuclearCarb 207C was needed to obtain the same retention time as 1 gr of 16-30 mesh Ag-ETS-10 granules. Ag-ETS-10 is hence a particularly promising material for use in a compact adsorption-based noble gas (Rn) trapping system.

| Adsorbent | Mass m (g) | Flow rate F (l/min) | Column diameter (cm) | Packing density (g/cm$^3$) | Retention time t (h) | Adsorption coefficient k (m$^3$/kg) |
|---|---|---|---|---|---|---|
| NuclearCarb 207C | 54.5 | 0.5 | 3.2 | 0.46 | 5.0 | 2.750 |
| Ag-13X | 105.3 | 0.5 | 3.2 | 0.88 | 9.4 | 2.680 |
| Ag-ETS-10 (1.5 mm pellets) | 30.5 | 0.5 | 3.2 | 0.83 | 116.7 | 115.000 |
| Ag-ZSM-5 | 14.5 | 0.5 | 2.0 | 0.44 | 24.7 | 50.960 |
| Ag-ETS-10 (16-30 mesh) | 4.7 | 1.0 | 1.0 | 1.05 | 25.0 | 320.000 |

Figure 7:
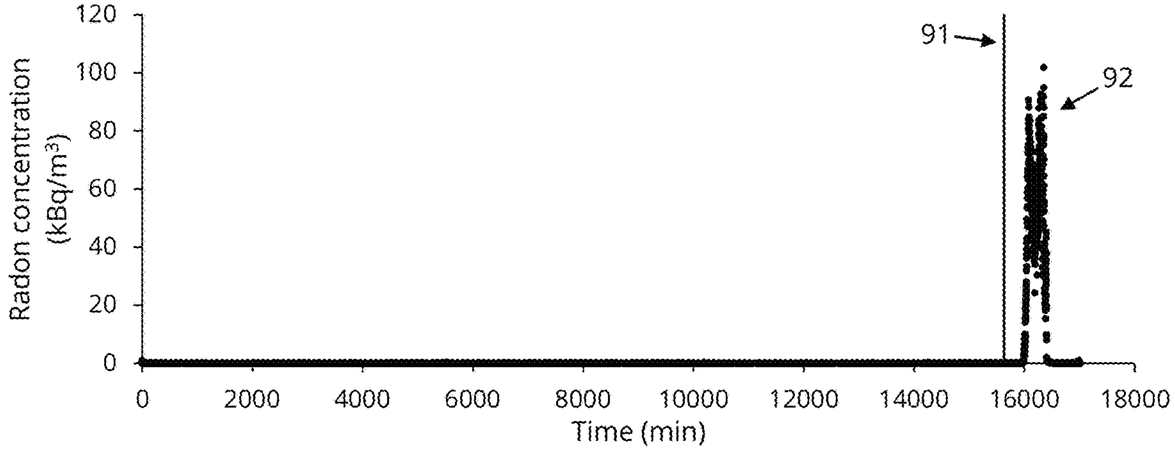
FIG. 7 is a graph of an $^{222}$Rn breakthrough curve for 1.5 mm Ag-ETS-10 pellets showing the effect of removing the moisture trap in accordance with the first example.
Figure 8:
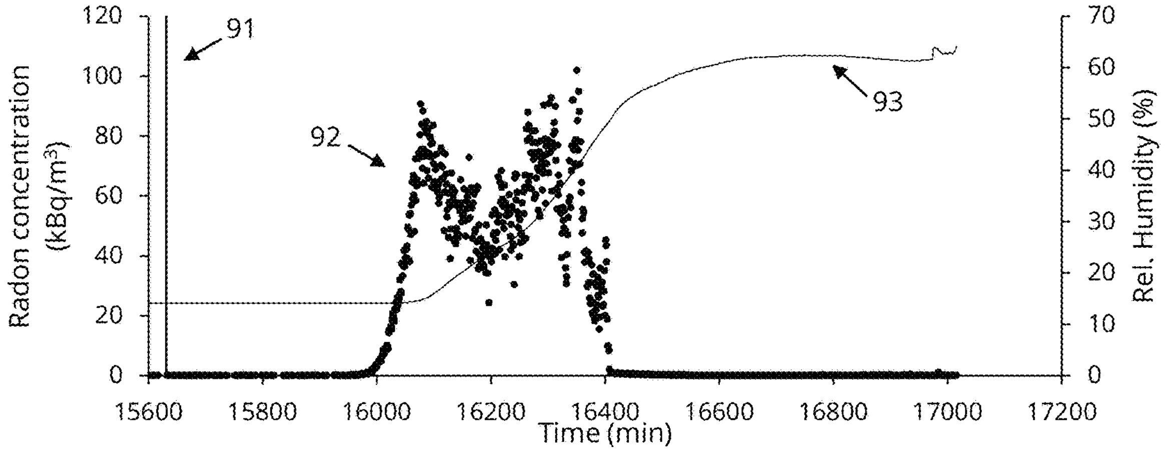
FIG. 8 is a graph showing a close-up of the curve in FIG. 7 together with the relative humidity as measured by the Rn monitor in accordance with the first example.

Effect of Moisture (Ag-exchanged) zeolites like Ag-ETS-10 also have an affinity for $H_2O$ and the effect of moisture adsorption on radon adsorption was therefore investigated. In an experiment, the moisture adsorption column (FIG. 2) has been removed in order to enable access of moisture to the adsorption column containing Ag-ETS-10. The experiment was running for more than 10 days without Rn breakthrough before the moisture trap was removed. After removal (91), Rn breakthrough (92) starts after just 6 hours (FIG. 7). FIG. 8 shows a close-up of the breakthrough curve, including the humidity readings from the radon monitor (93). These readings do not represent the actual moisture content in the tubing, but they do give an indication. The figure clearly shows that the breakthrough of radon is associated with a rise in humidity. Without being bound by theory, this could be tentatively attributed to Ag-ETS-10 retaining polar $H_2O$ and thereby occupying adsorption sites or even driving off the nonpolar Rn. As such, Ag-ETS-10 then basically serves as a moisture trap and once sufficiently saturated with $H_2O$, will no longer be retain the noble gas. Controlling the humidity level (dew point) of the gas volume prior to passing it over the noble gas adsorbent bed therefore allows to substantially better maintain the efficiency of said noble gas adsorbent bed.

Thermal Stability

Figure 9:
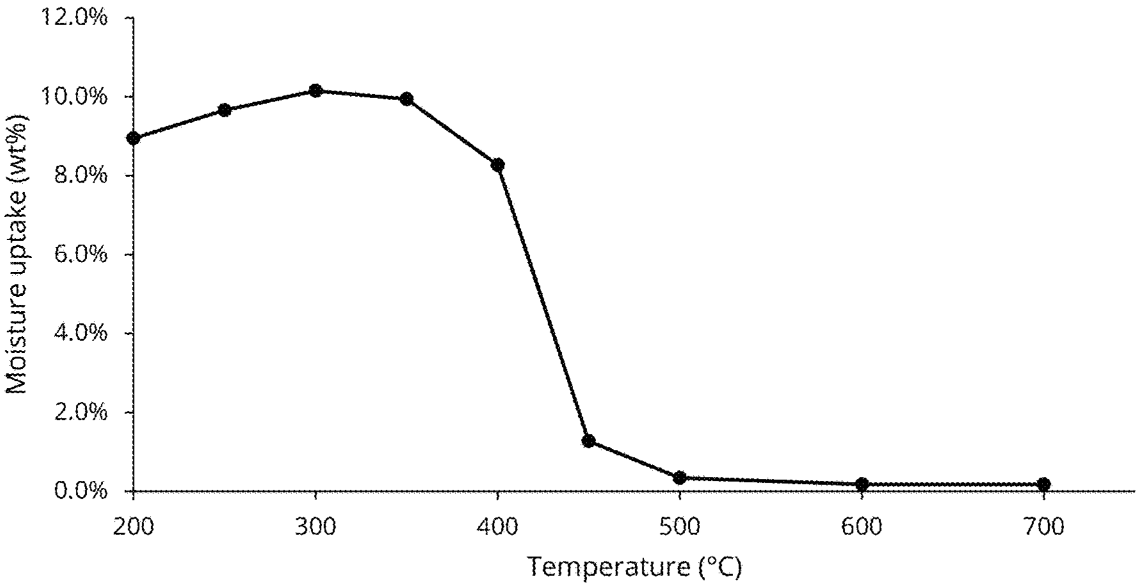
FIG. 9 is a graph of moisture uptake (in wt %) of 16-30 mesh Ag-ETS-10 granules in function of the regeneration temperature in accordance with the first and second example.

In another experiment the thermal stability of 16-30 mesh Ag-ETS-10 granules was evaluated through its ability to take up moisture. For this, Ag-ETS-10 samples of about 10 g were dried for 2 hours in a resistance furnace (cf. supra) at different temperatures ranging from 200 to 700° C. The moisture uptake ($H_2O$ capacity) was then allowed to reach an equilibrium and the mass gain was subsequently recorded with the same balance (cf. supra). The results are shown in FIG. 9. It was observed that the Ag-ETS-10 started to degrade at around 400° C. and fully loses its water adsorption capacity at about 500° C. Subsequently, a sample roasted at 500° C. was tested for radon retention and immediate breakthrough was observed, confirming a more general loss of its sorption properties.

Influence of Gas Contaminants

Figure 10:
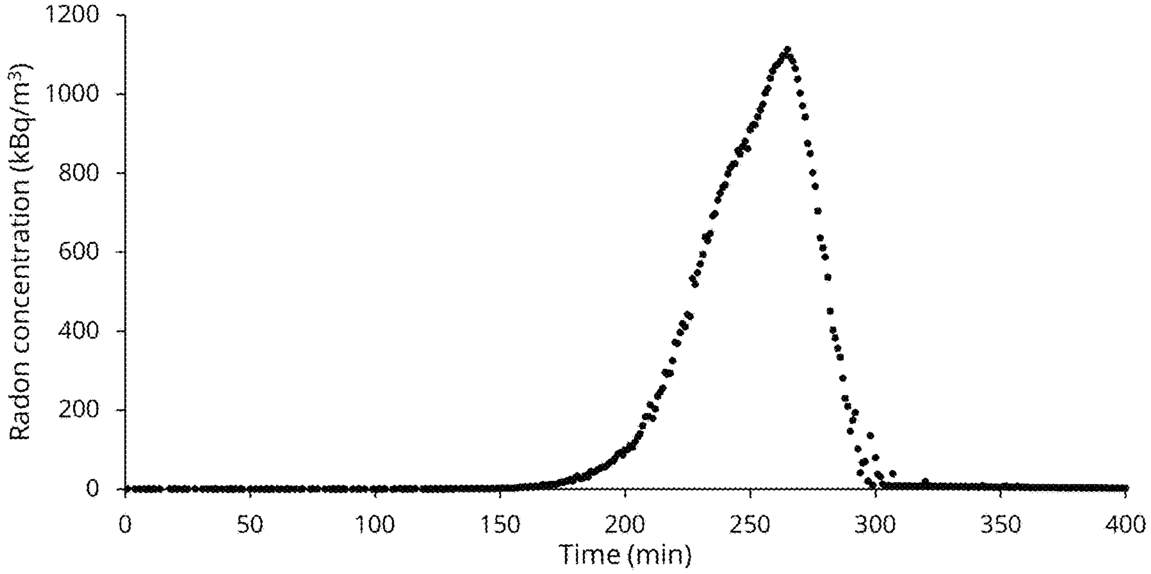
FIG. 10 is a graph of a $^{222}$Rn breakthrough curve for 16-30 mesh Ag-ETS-10 granules exposed to $H_2$ and $NO_x$ fumes in accordance with the first example.

To evaluate the influence of (poisonous) contaminants in the gas stream, 16-30 mesh Ag-ETS-10 was subjected to an air stream containing $H_2$ and ppm range $NO_x$ fumes (generated from a dissolution bottle containing metallic Cu in 4 M $HNO_3$); the subsequent $^{222}$Rn breakthrough curve is shown in FIG. 10. Consequently, a degradation of the sorbent material was observed, with visual observation indicating a colour change of Ag-ETS-10 from brown to white appearance and the subsequent test (cf. supra) showing a significant reduction in adsorption coefficient k to about 40000 ml/g (i.e. down from about 320000 ml/g; cf. supra). A regeneration cycle of the material could not restore its Rn adsorption capabilities, indicating an irreversible damage to the material caused by $NO_x$. Without being bound by theory, this could be tentatively attributed to $NO_x$ oxidizing the Ag; e.g. from metallic silver to $Ag^+$—in turn enabling to form $AgNO_3$ inside the microporous molecular sieve—, and/or to $AgO_2$ which is particularly susceptible to water adsorption by formation of hydrogen bonds. These effects can thus cause the noble gas adsorbent bed to lose its affinity thereto. If such poisonous contaminants can be expected in the gas volume, it can thus be beneficial to remove them prior to passing the gas volume over the noble gas adsorbent bed (and/or prior to passing it over the moisture adsorbent bed) in order to better maintain their efficiency.

Example 2

As previously noted, the aim of the experiments described under Example 1 was rather to illustrate and support a proof-of-concept for the present invention. By contrast, while the general approach was used and the same trends emerge, the setup was refined for Example 2 in order to better control the experimental conditions and yield more robust results.

1. Results

Figure 13:
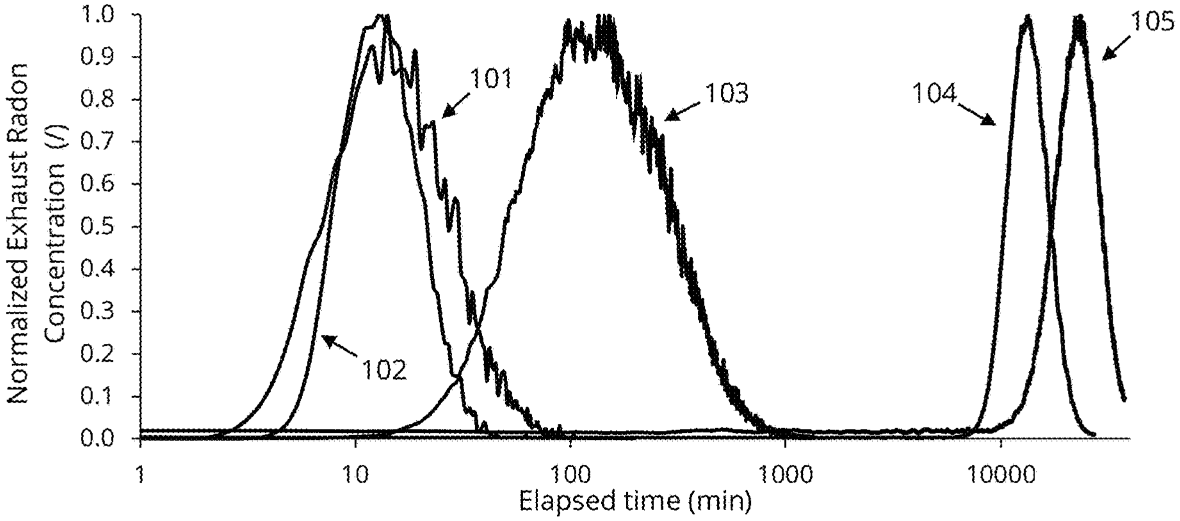
FIG. 13 is a graph of measured room temperature breakthrough curves of $^{222}$Rn on NuclearCarb 207C, CarboAct, Ag-13X, Ag-ZSM-5 and Ag-ETS-10 in accordance with a second example described herein.

The experimentally measured breakthrough curves at room temperature—using a flow rate of 2 L/min, an adsorbent bed volume of 17 $cm^3$, and a nitrogen carrier gas with dew point between −70 and −90° C.—for NuclearCarb 207C (101), CarboAct (102), Ag-13X (103), Ag-ZSM-5 (104) and Ag-ETS-10 (105) are given in FIG. 13.

While the breakthrough of Rn on both activated charcoals and Ag-13X occurred within several minutes after injection, its retention on Ag-ZSM-5 and on Ag-ETS-10 is considerably longer. For the last named material, the release of Rn was observed to begin 7 days after injection while only 1/32th of its initial activity could be detected due to its decay along the adsorption bed. A summary of the mass of each adsorbent material, the injected and ejected $^{222}$Rn activity, the Rn retention time, the packing density and the measured adsorption factor k is given in the table below.

| Material | Packing density ($kg/m^3$) | Mass (g) | Retention time (min) | k factor ($m^3$/kg) | Injected activity (kBq) | Released activity (kBq) |
|---|---|---|---|---|---|---|
| NuclearCarb 207C | 450 | 7.65 | 4 | 1.05 | 12 | 12.4 (*) |
| CarboAct | 250 | 4.20 | 6 | 2.86 | 16.7 | 15.9 |
| Ag-13X | 970 | 16.50 | 22 | 2.67 | 16.7 | 20.8 (*) |
| Ag-ZSM-5 | 520 | 8.85 | 8066 | 1820 | 1.03E+03 | 132.4 |
| Ag-ETS-10 | 950 | 16.30 | 11405 | 1400 | 1.07E+03 | 34.2 |

(*) Although it appears contradictory to have a higher released activity than the injected activity, these outliers are nevertheless compatible within the experimental error.

As can be seen in FIG. 13, similar results were obtained with Ag-ZSM-5, while the investigated carbon materials and Ag-13X have shown much weaker radon interaction.

Figure 14:
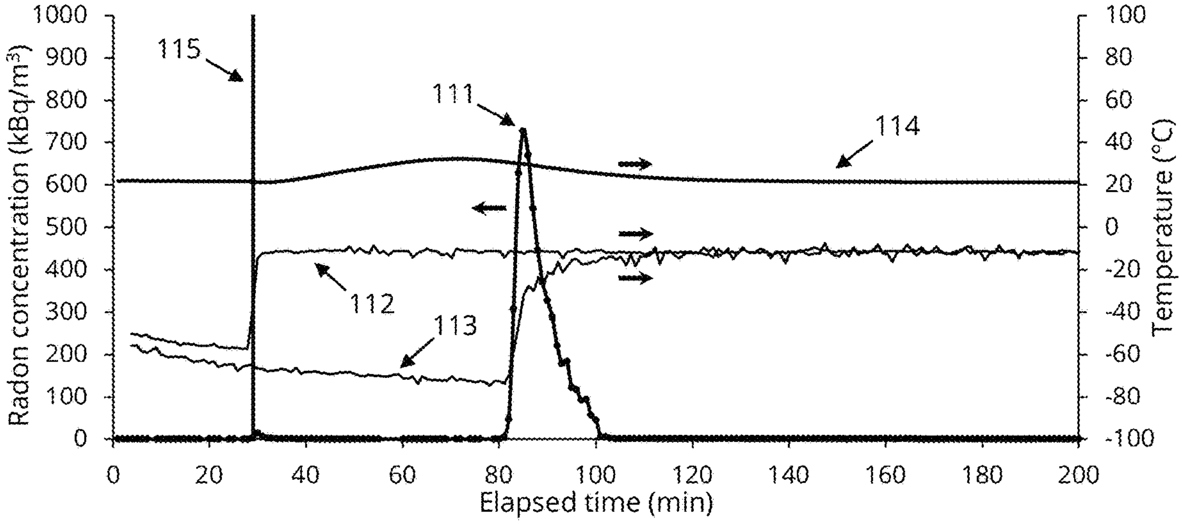
FIG. 14 is a graph of a measured release of $^{222}$Rn from Ag-ETS-10 upon contact with laboratory air of 50% rel. humidity in accordance with the second example.

As described in the Methods section below, all experiments were performed with bottled 5N nitrogen as carrier gas due to its low residual water content. The clear competitive effect of moisture towards Rn adsorption has been experimentally proven when laboratory air was allowed to pass over the adsorbent bed of Ag-ETS-10 after Rn adsorption had occurred. FIG. 14 gives the graphical representation of the Rn breakthrough curve (111) (using a flow rate of 2 L/min and a mass of adsorbent of 16.3 g), dew point in front of the Rn adsorption bed (112), dew point after the Rn adsorption bed (113), Rn absorption bed temperature (114) and the moment of letting ambient air in (115). As can be observed, the Rn breakthrough coincides exactly with the increase in dew-point of the ejected air stream. A temperature increase of the adsorption bed is measured upon moisture entering the column. It can be also seen that Rn leaves the adsorption bed as a sharp pulse, in contrast to the broad peak as observed in the previous experiment given in FIG. 13. This behaviour can be explained by the competition of water molecules with Rn for the active adsorption sites on Ag nanoparticles. Similar observations were made with Ag-ZSM-5. The result confirmed the powerful nature as a desiccant at low water partial pressure of both investigated materials, Ag-ETS-10 and Ag-ZSM-5.

2. Discussion

Based on the measured breakthrough curves of $^{222}$Rn on the investigated materials, Ag-ETS-10 and Ag-ZSM-5 both showed remarkable retention properties towards radon at room temperature. For each of these two synthetic zeolite-type frameworks, substantial reduction of 222Rn in the effluent gas stream can be achieved. 16.3 g of Ag-ETS-10 were able to retain MBq quantities of $^{222}$Rn over a period of one week and more than 20 $m^3$ (or $10^6$ bed volumes) of $N_2$ have passed over the column before a measurable increase in $^{222}$Rn concentration could be detected at the exhaust. At maximum breakthrough, the Rn release from the Ag-ETS-10 adsorption bed was delayed for 17 days, corresponding to approximately 4.5 half-lifes of $^{222}$Rn. Together with Ag-ZSM-5, Ag-ETS-10 exhibits adsorption factors for radon that are at least two orders of magnitude larger compared to NuclearCarb 207C, CarboAct and Ag-13X. To our knowledge, no measurement has yet been reported in scientific literature showing an adsorbent with radon adsorption factors exceeding 1000 $m^3$/kg at room temperature.

Moisture control was found to be of crucial importance for the evaluation of the obtained results. The investigated Ag-ETS-10 material showed to be a very potent desiccant and care must be taken when interpreting Rn breakthrough experiments with regard to possible interference with moisture co-adsorption. As a matter of fact, initial experiments performed with laboratory air (e.g. cf. Example 1) revealed large variations of measured adsorption factors for Rn due to changes in relative humidity in the laboratory. Careful in-situ regeneration of the material avoiding exposure to ambient humidity have proven to be of high importance for data reproducibility. Supporting experiments with a similar experimental system using laboratory air that was dried over a 13X moisture adsorption bed indicated that other air constituents such as Ar, Kr. Xe, $CO_2$ and CO show only minor competition with Rn (at least at concentrations typically encountered in ambient air), while a strong influence of the relative humidity was observed. This is advantageous for the design of an efficient but simple Rn adsorption system for air purification, since only dehumidification of the inlet air stream—or dehumidification in combination with removal of oxidizing species and/or acid vapours (cf. infra)—will be required for an efficient trapping of Rn. It has been recently shown, however, that organic species containing chlorine show a measurable poisoning effect on Ag-ZSM-5 with regard to Xe adsorption. It can be concluded that proper protection of the adsorption bed from species oxidizing silver may prove useful.

Notwithstanding, the revolutionary nature of Ag-ETS-10 and Ag-ZSM-5 can be visualized by a following example of a proposed Rn reduction system for air purification in laboratories requiring low background environments. Assuming a throughput of 100 $m^3$/h of air with a $^{222}$Rn activity concentration of 20 Bq/$m^3$, an adsorption bed of 30 cm diameter and 100 cm height (V=70 L) could delay the incoming Rn stream by 650 h or four weeks (k=1000 $m^3$/kg). This would correspond to a breakthrough $^{222}$Rn activity concentration of 0.15 Bq/$m^3$ in the effluent air stream of a single continuously working adsorption column at room temperature. Similar adsorption systems based on activated charcoal require several cubic meters of bed volume and cryogenic cooling. This clearly proves the economic potential of silver-exchanged zeolites in Rn related research and air separation industry.

It can be easily shown that using such a system, a significant accumulation of Rn occurs on the column upon reaching steady-state conditions where the decay rate of adsorbed Rn approaches its incoming flux. Moreover, as results in FIG. 14 indicate, Rn can be efficiently stripped in a limited volume by allowing moisture to pass over the adsorption bed and thereby displacing Rn. For the above mentioned example, 100 kBq of $^{222}$Rn can be obtained in a few $m^3$ that can further be concentrated on a column of much smaller scale.

Another—even if possibly more exotic—application of the described zeolite adsorbents lies in the potential to significantly reduce $^{222}$Rn emissions originating from handling $^{226}$Ra compounds for the production of medical relevant radioisotopes. To the best of our knowledge, an implementation of zeolites as $^{222}$Rn adsorbent—e.g. into a hot-cell—for handling larger quantities (e.g. in the order of grams or higher) of $^{226}$Ra has not been reported before.

3. Materials

Absorbent materials Ag-ZSM-5, Ag-ETS-10 (granular, mesh 16-30), Ag-13X and Nuclearcarb 207C were as described in Example 1. Additionally, CarboAct High Purity Carbon (fragmented, 0.01-0.4 cm) was obtained from Carbo-act International, Netherlands. The moisture adsorbent 13X APG was obtained from UOP CH Sarl, Switzerland, as spherical 8×12 mesh beads.

Like for Example 1, 222Rn was generated and supplied by degassing a PYLON RN-1025 flow-through 3.8 MBq $^{226}$Ra source provided by PYLON Electronics Inc., Canada. Before each experiment, the source was degassed in order to allow a certain activity of $^{222}$Rn to grow in prior to each performed experiment.

4. Methods

Experimental Rn Adsorption Setup

Figure 12:
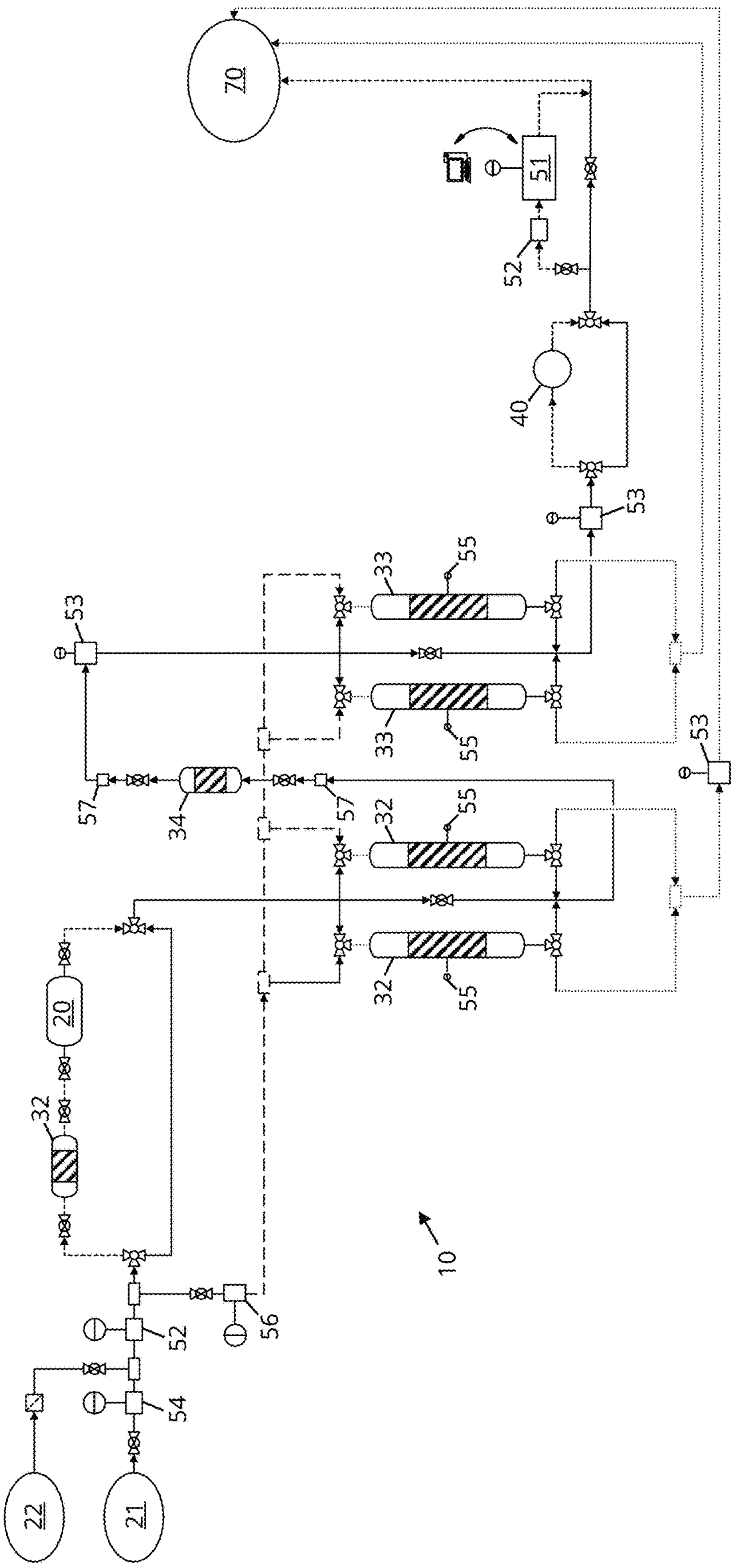
FIG. 12 schematically depicts an experimental setup used for radon adsorption experiments in accordance with the second example.

Rn adsorption experiments were performed in a laboratory scale setup (10) placed inside a fume hood ('exhaust' 70). It is schematically depicted in FIG. 12. The trapping device consists of two redundant moisture traps (32) and two Rn adsorption columns (33), hygrometers (dew point meters; 53) for indication of the moisture content in the system, flow controllers (MFC and VA-flowmeter; 52), a vacuum pump (40) and a radon monitor (51). The system is built out of stainless steel tubing (¼" OD; solid or long-dashed lines), fittings and valves to assure leak tightness and moisture control. Where possible/sensible, flexible PFA (perfluoroalkoxy) tubing (short-dashed or dotted lines) is used. The solid (stainless steel) and short-dashed (PFA) lines indicated the forward loop, while the long-dashed (stainless steel) and dotted (PFA) lines indicate the regeneration loop.

Nitrogen, supplied from an in-house $LN_2$ supply tank (21), is reduced in pressure (54) and fed into the experimental system as a carrier gas. Notwithstanding, the setup also allowed to use/let in ambient air (22). The flow of the carrier gas in the setup is controlled by a thermal mass flow controller (Red-y smart, Vogtlin Instruments GmbH, Switzerland; 52).

The setup is equipped with two redundant moisture traps (32) filled with molecular sieve 13X to reduce moisture content of the incoming gas. The columns were designed and manufactured in-house. Both columns have a volume of approx. 385 $cm^3$ (inner diameter of 4.05 cm and length of 30 cm) and are made of stainless steel (SS 316). A CF flange with Cu seal on top of the column allows for opening and closing of the column and ensures leak tightness. Redundancy is provided to be able to ensure continuous operation when one column is saturated (or being regenerated at some point). Several dew point transmitters (53; Easidew online, Michell Instruments, UK) are installed in the setup to measure the moisture content at different positions of the setup.

The radon adsorption is performed within one of the adsorption columns (33). These columns can be filled with a sorbent of choice. The columns were designed and manufactured in-house. Both columns have a volume of approx. 17 $cm^3$ (inner diameter of 1.2 cm and length of 15 cm) and are made of stainless steel (SS 316). A CF flange with Cu seal on top of the column allows for opening and closing of the column and ensures the leak tightness.

The setup enables regeneration of different sorbents in situ, i.e. while keeping the sorbent in the column. The heating of the stainless steel column is performed via an electrical heating wire connected to a temperature controller that regulates the temperature to a predetermined set-point via a thermocouple (55). The thermocouple (55) is positioned on the outer wall of the column. The columns and heating wire are thermally insulated with glass fibre tape.

The outgoing radon concentration is monitored by sampling of a part of the exhaust stream with a radon monitor (51), namely an AlphaGUARD Professional Radon Monitor DF2000, Bertin GmbH, Germany. It enables a continuous determination of the volumetric radon concentration with a measuring range from 2 $Bq/m^3$ to 2 $MBq/m^3$. The monitor is equipped with a flow-regulated pump which can be adjusted from 0.05 L/min to 2 L/min, which allows sampling of the exhaust stream.

The setup is equipped with a (vacuum)pressure transmitter (pressure range of 1 to 2.5 bar; 56) which allows for pressure monitoring within the setup. Additionally, this transmitter is used to validate the leak tightness of the setup and the columns, in particular after opening and closing.

A (removable) adsorbent column (120 $cm^3$; 34) can be inserted into the experimental loop via quick-connects (57) to enable the degassing of the Rn source. Once removed, the loop is closed via stainless steel tubing.

Material Regeneration

Each tested adsorbent underwent an activation step via heat treatment under inert gas conditions prior to each experiment. In each case, dry nitrogen was used as regeneration gas. The activation was performed for at least 15 h at 230° C. for Ag-ETS-10, 250° C. for Ag-13X and Ag-ZSM-5, while for both activated carbons 150° C. was chosen. The moisture adsorbent 13X APG was regenerated at 280° C. Nitrogen was supplied from an in-house $LN_2$ supply tank with a nominal pressure of 8 bar and a dew point of between −70 and −90° C.

Breakthrough Experiments

Breakthrough experiments were performed according to the same general flow chart as for Example 1 (cf. FIG. 3).

In a first step the radon source (Pylon RN-1025) is degassed onto a column with activated carbon (NuclearCarb 207C) to remove the accumulated $^{222}Rn$, in equilibrium with 3.8 MBq $^{226}Ra$. The degassing step is necessary in order to reduce the total $^{222}Rn$ activity injected in the test setup. A column with approx. 50 g NuclearCarb 207C is installed. The degassing is performed for 1 hour at 0.5 L/min. The column is removed after complete degassing of the radon source.

After the degassing, radon starts accumulating again in the source until the desired activity is reached. In a next step, the accumulated radon is injected into the selected adsorbent column by flushing the radon source with the experimental flow rate for 5 min.

After trapping the radon on the column, the radon source is closed off and $N_2$ is fed to the column until all injected radon has passed through the column (complete breakthrough). At this point the experiment is terminated.

The adsorption factors k ($m^3/kg$) for each tested adsorbent were calculated using the formula given as $$k = \frac{t * F}{m}$$

where t is the retention time in s, m the mass of adsorbent in kg and F the volumetric flow rate in $m^3/s$. The mean retention time t was taken as the time of the measured breakthrough radon activity concentration to be 5% of the maximum radon activity concentration observed. For large datasets, the data is averaged over 250 points. The retention time is then taken as the time at which an average value of 5% of the maximum average value is observed. The overall uncertainty associated to the measured adsorption factors is estimated to be in the order of 20%.

Example 3

Example 1 and/or Example 2 are repeated but using a different, low-polarizable (cf. supra) carrier gas, such as Ar, $O_2$, Ne, He or mixtures therewith.

Figure 15:
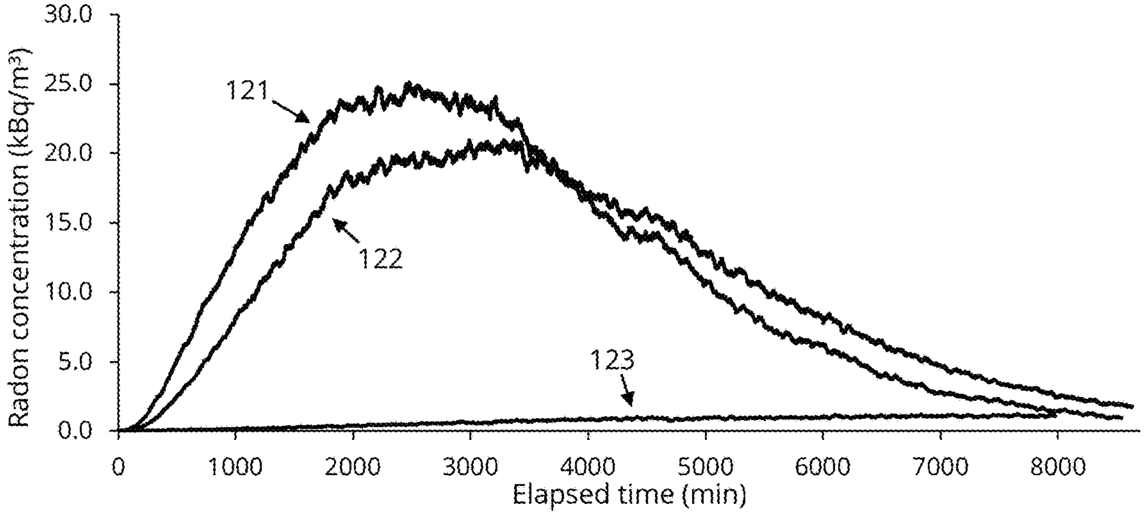
FIG. 15 is a graph of measured breakthrough curves of $^{222}$Rn from Ag-ETS-10 for different (dry) carries gasses ($N_2$, air and Ar) in accordance with a third example described herein.

FIG. 15 gives the graphical representation of experimentally measured Rn breakthrough curves on Ag-ETS-10 with the use of different carrier gasses, being nitrogen, (dry) air and Ar (using a flow rate of 3 L/min, 485 kBq $^{222}Rn$ injected each run and a mass of adsorbent of 3 g). The nitrogen is supplied from an in-house $LN_2$ supply tank. The air is provided via a central compressed air supply of the building, which is additionally dried over a 13X molecular sieve. Finally, the argon is supplied via gas cylinders (Ar technical grade 4.8, X50S, Air Products). The measured dew point over the different experiments is similar, averaging at approximately −80° C.

It is observed that the use of dry air (which is approximately composed of 78% $N_2$, 21% $O_2$ and 1% Ar; $O_2$ and Ar both being less polarizable than $N_2$) resulted in an increase in the Rn retention time of about 30%-40% compared to pure $N_2$. The use of Ar already led to such an increase in retention time that it was decided to terminate the experiment early. By comparison of the obtained data, an increase in retention time of approximately a factor 7 can be expected. The increase in retention time indicates a weaker interaction of the carrier gas with the adsorbent material, which makes for less competition with radon for the adsorption sites. $N_2$ has a stronger interaction with Ag-ETS-10 than air, which in turn has a stronger interaction than Ar. Without being bound by theory, the strength of adsorption of a nonpolar gas depends in a first approximation on its polarizability, therefore the higher the polarizability the stronger the interaction with the noble gas adsorbent bed (e.g. with the transition metal therein).

Having even lower polarizabilities, even larger effects may be achieved using gasses such $O_2$, Ne, He or mixtures therewith.

It is to be understood that although preferred embodiments, specific constructions, configurations and materials have been discussed herein in order to illustrate the present invention. It will be apparent to those skilled in the art that various changes or modifications in form and detail may be made without departing from the scope of the invention as defined in the appended claims.

The invention claimed is:

1. A method for removing a radioactive noble gas from a gas volume, comprising:

a) providing the gas volume such that a dew point of the gas volume is −20° C. or less; and b) passing the gas volume over a noble gas adsorbent bed of a microporous molecular sieve comprising a transition metal disposed on and/or in the microporous molecular sieve, thereby adsorbing the radioactive noble gas to the noble gas adsorbent bed;

wherein the radioactive noble gas is Rn, wherein the microporous molecular sieve is an ETS-10 or ZSM-5, and wherein the method is performed at a temperature of from 0° C. to 30° C.

2. The method according to claim 1, wherein the microporous molecular sieve comprises transition metal nanoparticles, and/or is a transition-metal-exchanged microporous molecular sieve.

3. The method according to claim 1, wherein the transition metal is selected from group 10, group 11 and the platinum group.

4. The method according to claim 1, wherein the gas volume comprises a nonpolar carrier gas having a polarizability of 1.700 $Å^3$ or below.

5. The method according to claim 1, wherein the gas volume comprises a nonpolar carrier gas having a polarizability of 1.664 $Å^3$ or below.

6. The method according to claim 1, wherein step a comprises passing the gas volume over a moisture adsorbent bed.

7. The method according to claim 1, comprising a further step c of:

c) regenerating the noble gas adsorbent bed and/or a moisture adsorbent bed.

8. The method according to claim 7, wherein step c comprises:

heating the noble gas adsorbent bed and/or the moisture adsorbent bed;

and/or flushing the noble gas adsorbent bed and/or the moisture adsorbent bed with a regeneration gas.

9. The method according to claim 1, comprising a further step a', before step b, of:

a') removing a substance that is poisonous to the noble gas adsorbent bed and/or to a moisture adsorbent bed from the gas volume.

10. The method according to claim 1, wherein the adsorbed radioactive noble gas is held until it has effectively decayed.

11. The method according to claim 1, wherein the adsorbed radioactive noble gas is collected for further storage and/or utilization.

12. The method according to claim 1, performed at room temperature.

13. The method according to claim 1, performed in a nuclear environment.

* * * * *